(12) United States Patent
Okumura et al.

(10) Patent No.: US 12,015,754 B2
(45) Date of Patent: Jun. 18, 2024

(54) IMAGE PROCESSING APPARATUS, PRINTING SYSTEM, AND IMAGE PROCESSING METHOD

(71) Applicant: SEIKO EPSON CORPORATION, Tokyo (JP)

(72) Inventors: Yoshio Okumura, Nagano (JP); Naoki Kayahara, Nagano (JP); Tsubasa Nakatsuka, Nagano (JP); Yuto Tenguishi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/452,592

(22) Filed: Aug. 21, 2023

(65) Prior Publication Data

US 2024/0064259 A1    Feb. 22, 2024

(30) Foreign Application Priority Data

Aug. 22, 2022    (JP) ................................. 2022-131504

(51) Int. Cl.
  *G06F 3/12*    (2006.01)
  *H04N 1/387*    (2006.01)
  *H04N 1/393*    (2006.01)

(52) U.S. Cl.
  CPC ......... *H04N 1/3935* (2013.01); *H04N 1/3873* (2013.01)

(58) Field of Classification Search
  None
  See application file for complete search history.

(56) References Cited

U.S. PATENT DOCUMENTS

| 5,917,963 | A  | * | 6/1999 | Miyake | ................. | G06T 3/4007 |
|---|---|---|---|---|---|---|
| | | | | | | 382/199 |
| 2004/0160439 | A1 | * | 8/2004 | Xavier | ..................... | G06T 5/73 |
| | | | | | | 345/419 |
| 2006/0013499 | A1 | * | 1/2006 | Namie | .................. | G06T 3/4007 |
| | | | | | | 382/254 |
| 2007/0047828 | A1 | * | 3/2007 | Ishii | ..................... | H04N 1/3935 |
| | | | | | | 382/232 |
| 2009/0226097 | A1 | * | 9/2009 | Matsumoto | ............. | G06T 3/403 |
| | | | | | | 382/199 |

(Continued)

FOREIGN PATENT DOCUMENTS

JP        2001-258040 A    9/2001

*Primary Examiner* — Dung D Tran
(74) *Attorney, Agent, or Firm* — Global IP Counselors, LLP

(57) ABSTRACT

An image processing apparatus includes a datum point determination unit configured to determine coordinates of a datum point for determining pixel values of second pixels included in a converted image including a plurality of second pixels in a coordinate plane of an input image including a plurality of first pixels, and an interpolation unit configured to determine pixel values of the second pixels based on a plurality of reference pixels. The datum point determination unit sets coordinates in the first direction of the first pixels among the plurality of first pixels as first direction end portion coordinates, and determines coordinates in the first direction of the datum point of the second pixels among the plurality of second pixels to be coordinates shifted to further inside of the input image than the first direction end portion coordinates by a distance longer than 0 and shorter than one pixel.

10 Claims, 16 Drawing Sheets

(56) References Cited

U.S. PATENT DOCUMENTS

| | | | |
|---|---|---|---|
| 2010/0008599 A1* | 1/2010 | Kawabe | G06T 3/4007 382/300 |
| 2012/0057209 A1* | 3/2012 | Nakamura | H04N 1/3935 382/167 |
| 2012/0163720 A1* | 6/2012 | Saito | H04N 1/3935 382/195 |

* cited by examiner

COMPARATIVE EXAMPLE

INPUT IMAGE:
1000 × 1000 PIXELS

INPUT IMAGE:
1001 × 1001 PIXELS

INPUT IMAGE:
1002 × 1002 PIXELS

INPUT IMAGE:
1003 × 1003 PIXELS

COMPARATIVE EXAMPLE

INPUT IMAGE:
1000 × 1000 PIXELS

INPUT IMAGE:
1001 × 1001 PIXELS

INPUT IMAGE:
1002 × 1002 PIXELS

INPUT IMAGE:
1003 × 1003 PIXELS

IMAGE PROCESSING APPARATUS, PRINTING SYSTEM, AND IMAGE PROCESSING METHOD

The present application is based on, and claims priority from JP Application Serial Number 2022-131504, filed Aug. 22, 2022, the disclosure of which is hereby incorporated by reference herein in its entirety.

BACKGROUND

1. Technical Field

The present disclosure relates to technology for converting the resolution of an image.

2. Related Art

In order to convert the resolution of an image having a plurality of pixels arranged in two directions orthogonal to each other, the number of pixels of the image is converted by an interpolation operation using a bicubic method or the like. The conversion for increasing the resolution of the image increases the number of pixels of the image, and the conversion for decreasing the resolution of the image decreases the number of pixels of the image. Here, the two directions orthogonal to each other are defined as an X direction and a Y direction. A computer that performs an interpolation operation using a bicubic method determines coordinates of a datum point for determining a pixel value of each pixel of a converted image in an X-Y coordinate plane adjusted to an input image, and uses pixel values of 4×4 pixels with reference to a datum point in an input image for the interpolation operation. For example, the datum point of the pixel at the origin of the converted image is aligned with a position of the pixel at the origin of the input image.

In a technology disclosed in JP-A-2001-258040, an edge is determined from a processing target image, color interpolation processing is performed on the edge portion by a bicubic method, and the color interpolation processing is performed on portions other than the edge portion by uniform averaging in a pixel range of n×m set around a target pixel.

In the interpolation operation by the bicubic method, when the datum point is aligned with the position of the pixel of the input image, the pixel value of the pixel corresponding to the datum point in the converted image becomes a pixel value of the pixel at the position of the datum point in the input image. For example, the pixel value of the pixel at the origin of the converted image is a pixel value of the pixel at the origin of the input image. In addition, the hue of the pixels present on two sides passing through the origin in the converted image strongly appear as the hue of the pixels present on two sides passing through the origin in the input image. As a result, there is a difference in the hue between the pixels present on the two sides passing through the origin and the pixels present on the inner side in the converted image. Therefore, it is desirable to reduce such a difference in the hue in the converted image.

The above-described problem also is present when an interpolation operation other than the interpolation operation by the bicubic method, such as an interpolation operation by a bilinear method is performed.

SUMMARY

An image processing apparatus according to an aspect of the present disclosure is an image processing apparatus configured to perform image processing of converting a resolution of an input image including a plurality of first pixels arranged in a first direction and a second direction intersecting the first direction and thereby acquiring a converted image including a plurality of second pixels arranged in the first direction and the second direction, the image processing apparatus including a datum point determination unit configured to, in a coordinate plane of the input image, determine coordinates of a datum point for determining pixel values of the second pixels included in the converted image, and an interpolation unit configured to determine the pixel values of the second pixels based on pixel values of a plurality of reference pixels within a predetermined range based on the datum point among the plurality of first pixels, wherein coordinates in the first direction of the first pixels present at both ends in the first direction among the plurality of first pixels are set as first direction end portion coordinates, and the datum point determination unit determines coordinates in the first direction of the datum point of the second pixels present at both ends in the first direction among the plurality of second pixels to be coordinates shifted to further inside of the input image than the first direction end portion coordinates by a distance longer than 0 and shorter than one pixel of the input image.

Further, a printing system of the present disclosure includes the image processing apparatus, a print head including a plurality of nozzles configured to discharge liquid onto a medium, and a control unit configured to control discharge of the liquid from the print head so that a printed image based on the converted image is formed on the medium.

An image processing method of the present disclosure is an image processing method for converting a resolution of an input image including a plurality of first pixels arranged in a first direction and a second direction intersecting the first direction and thus acquiring a converted image including a plurality of second pixels arranged in the first direction and the second direction, the image processing method including a datum point determination step of determining, in a coordinate plane of the input image, coordinates of a datum point for determining a pixel value of the second pixel included in the converted image, and an interpolation step of determining a pixel value of the second pixel based on pixel values of a plurality of reference pixels in a predetermined range with reference to the datum point among the plurality of first pixels, wherein coordinates in the first direction of the first pixels present at both ends in the first direction among the plurality of first pixels are first direction end portion coordinates, and in the datum point determination step, coordinates in the first direction of the datum point of the second pixels present at both ends in the first direction among the plurality of second pixels are determined to be coordinates shifted to further inside of the input image than the first direction end portion coordinates by a distance longer than 0 and shorter than one pixel of the input image.

DESCRIPTION OF EMBODIMENTS

Figure 1:
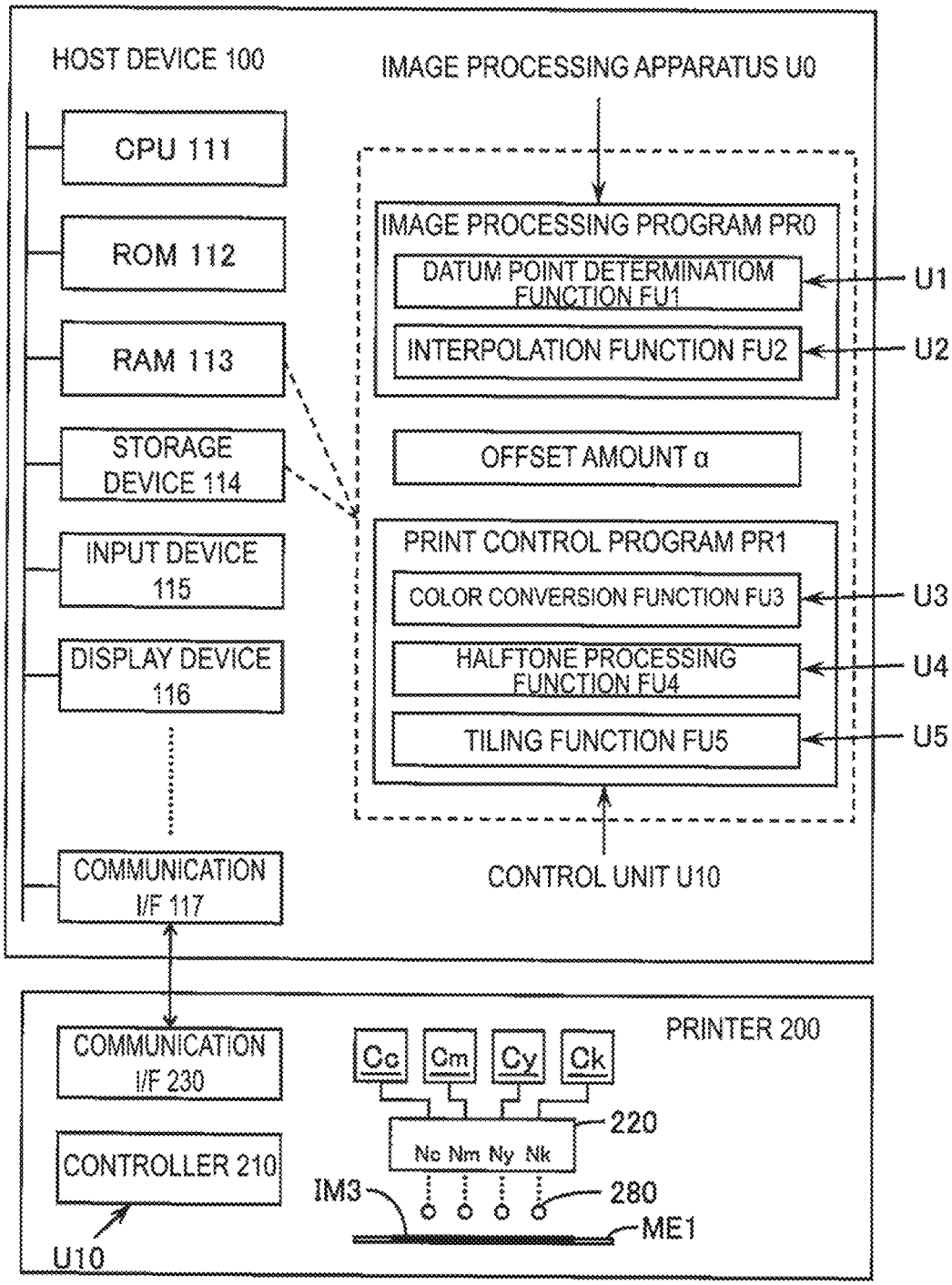
FIG. 1 is a block diagram schematically illustrating a configuration example of a printing system including an image processing apparatus.

Embodiments of the disclosure will be described. Of course, the following embodiments only illustrate the disclosure, and not all features illustrated in the embodiments are indispensable for the solution of the disclosure.

(1) OVERVIEW OF TECHNIQUE INCLUDED IN PRESENT DISCLOSURE

First of all, an overview of technique included in the present disclosure will be described with reference to examples illustrated in FIG. 1 to FIG. 16. The drawings of the present application schematically illustrate the examples, and an enlargement factor in each direction illustrated in each drawing may vary among the drawings, and the drawings may not be consistent with one another. Of course, the elements of the technique are not limited to specific examples illustrated with reference numerals. In the section "Overview of Technique Included in Present Disclosure", a word included in parentheses is for supplementary description of the immediately preceding word.

Aspect 1

Figure 2:
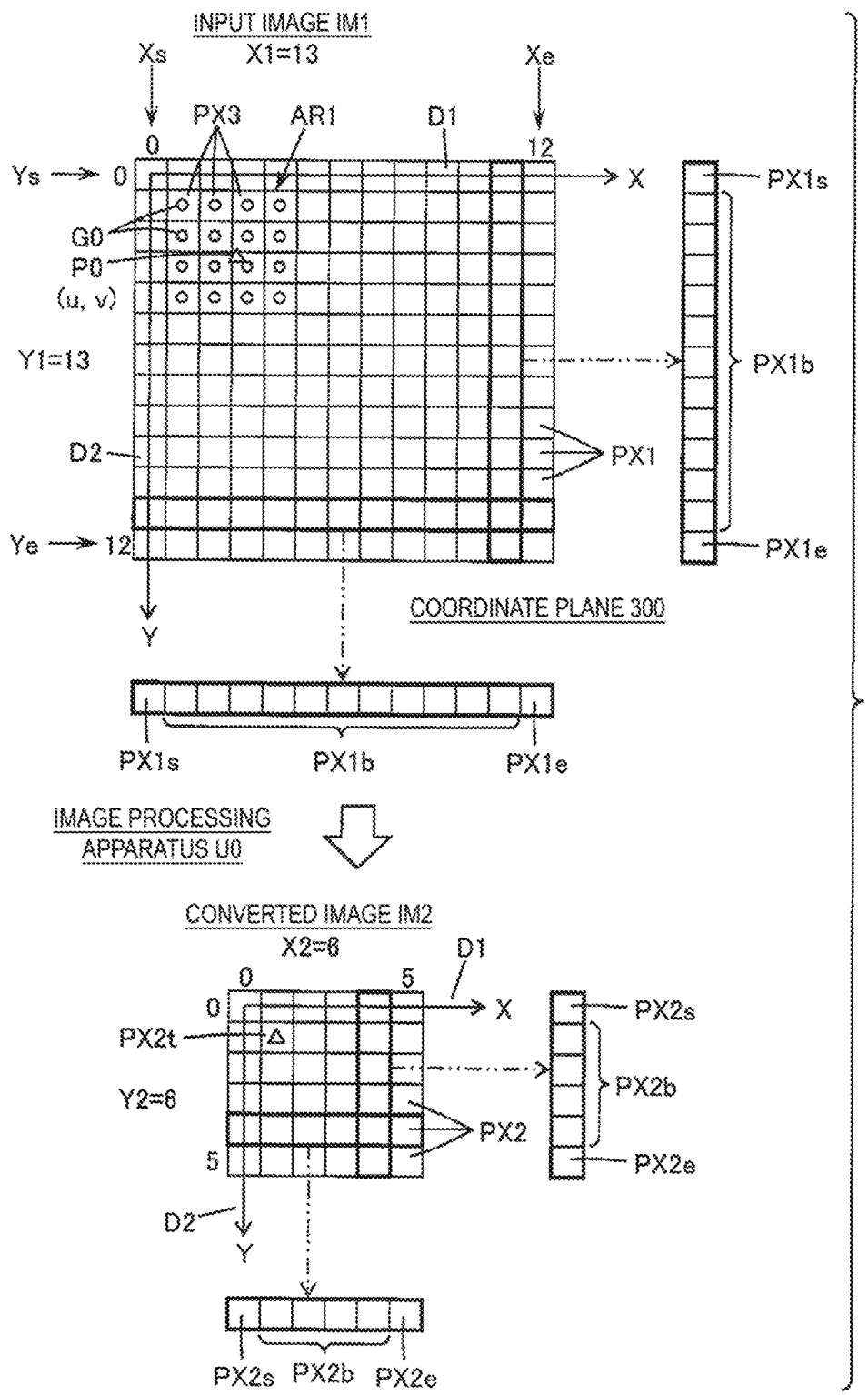
FIG. 2 is a diagram schematically illustrating an example of resolution conversion from an input image to a converted image.
Figure 5:
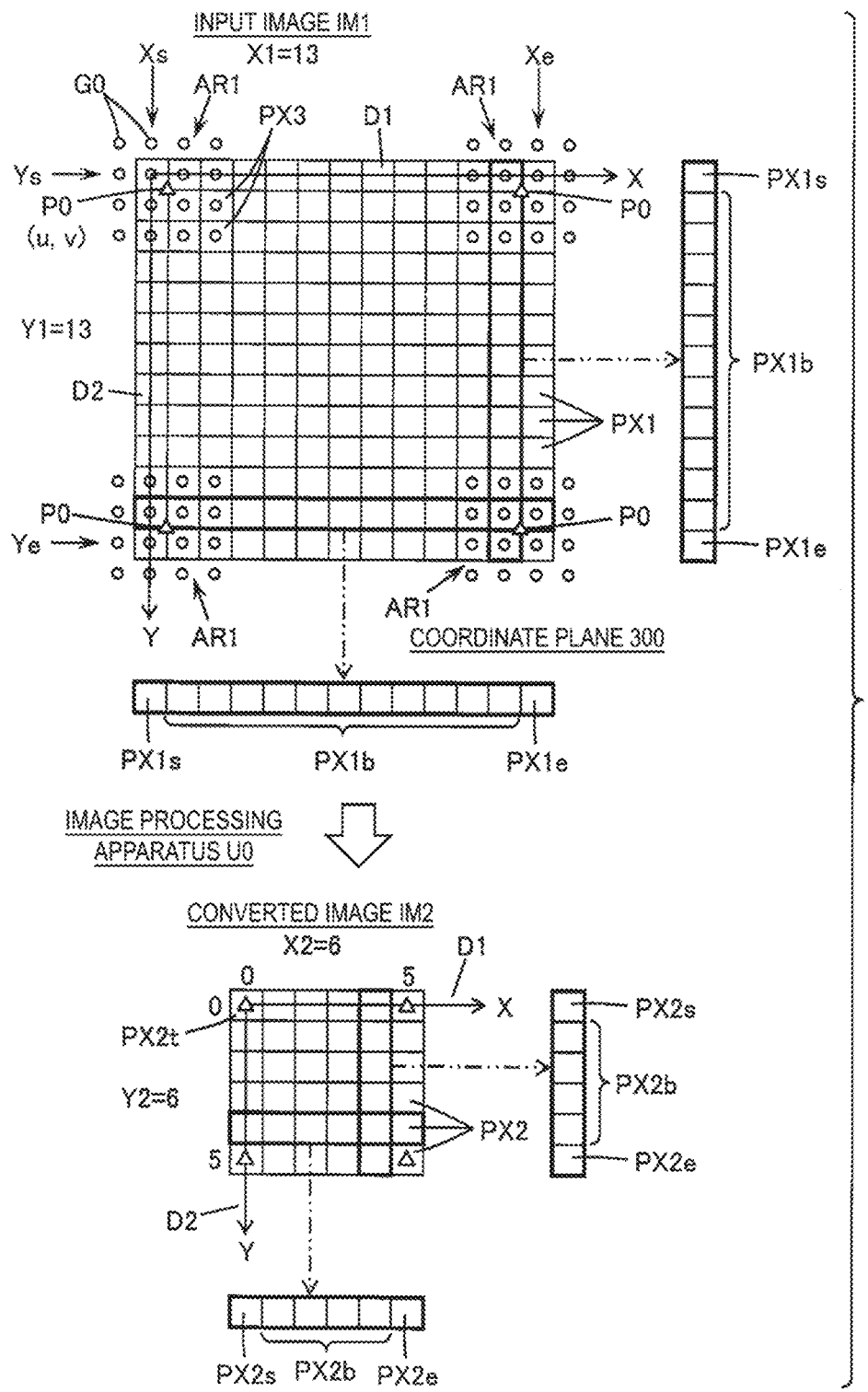
FIG. 5 is a diagram schematically illustrating an example of a datum point and a reference point for a second pixel at a corner portion of a converted image in resolution conversion for reducing the number of pixels.

As illustrated in FIGS. 2 and 5 and the like, an image processing apparatus U0 according to an aspect of the present technology is capable of performing image processing of converting a resolution of an input image IM1 including a plurality of first pixels PX1 arranged in a first direction D1 and a second direction D2 intersecting the first direction D1 and thereby acquiring a converted image IM2 including a plurality of second pixels PX2. The image processing apparatus U0 includes a datum point determination unit U1 and an interpolation unit U2 (refer to FIG. 1). The datum point determination unit U1 determines coordinates (u, v) of a datum point P0 for determining pixel values of the second pixels IM2 included in the converted image IM2 in a coordinate plane 300 adjusted to the input image IM1. The interpolation unit U2 determines pixel values of the second pixels PX2 based on pixel values of a plurality of reference pixels PX3 within a predetermined range AR1 based on the datum point P0 among the plurality of first pixels PX1.

Here, coordinates in the first direction D1 of the first pixels present at both ends in the first direction D1 among the plurality of first pixels PX1 are set as first direction end portion coordinates Xs, Xe. As illustrated in FIGS. 4, 5 and 7 to 9, the datum point determination unit U1 determines coordinates of the datum point P0 in the first direction D1 with respect to the second pixels (a second start end pixel PX2s and a second terminal end pixel PX2e) present at both ends in the first direction D1 among the plurality of second pixels PX2 to be coordinates shifted to further inside of the input image IM1 from the first direction end portion coordinates Xs and Xe by a distance longer than 0 and shorter than one pixel of the input image IM1.

In the above-described aspect, the coordinates in the first direction D1 of the datum point P0 of the second start end pixel PX2s and the second terminal end pixel PX2e included in the converted image IM2 are coordinates shifted to inside of the input image IM1 from the first direction end portion coordinates Xs, Xe by a distance longer than 0 and shorter than one pixel of the input image IM1. As a result, it is avoided that the datum point P0 of the second start end pixel PX2s and the second terminal end pixel PX2e is shifted from a position of a pixel of the input image IM1 in the first direction D1, and hue of the first pixel PX1 present at an end portion of the input image IM1 strongly appears in the second start end pixel PX2s and the second terminal end pixel PX2e. Therefore, the above aspect can provide an image processing apparatus capable of further harmonizing the hue in the image after the resolution conversion.

Here, the conversion of the resolution of the input image means conversion of performing at least one of enlargement for increasing the number of pixels and reduction for reducing the number of pixels in at least one of the first direction and the second direction. Therefore, the conversion of the resolution of the input image includes, for example, conversion in which the number of pixels is changed in the first direction and the number of pixels is not changed in the second direction, conversion in which the number of pixels is increased in the first direction and the number of pixels is decreased in the second direction, and the like.

In the present application, "first", "second", . . . are terms for distinguishing components included in a plurality of components having similarities, and do not indicate an order. To which components among the plurality of components "first", "second", . . . are applied is relatively determined. For example, when the plurality of first pixels of the input image are arranged in an X direction and a Y direction, when the X direction corresponds to the first direction, the Y direction corresponds to the second direction, and when the Y direction corresponds to the first direction, the X direction corresponds to the second direction.

The description above is also applied to the aspects below.

Aspect 2

In addition, coordinates in the second direction D2 of the first pixels present at both ends in the second direction D2 among the plurality of first pixels PX1 are set as second direction end portion coordinates Ys, Ye. The datum point determination unit U1 may determine coordinates in the second direction D2 of the datum point P0 with respect to the second pixels present at both ends in the second direction D2 among the plurality of second pixels PX2 to be coordinates shifted to further inside of the input image IM1 from the second direction end portion coordinates Ys, Ye by a distance longer than 0 and shorter than one pixel of the input image IM1.

In the above case, the datum point P0 of the second start end pixel PX2s and the second terminal end pixel PX2e in the converted image IM2 is also shifted from the position of the pixel of the input image IM1 in the second direction D2, and strong appearance of the hue of the first pixel PX1 present at the end portion of the input image IM1 is avoided in the above-described second start end pixel PX2s and the second terminal end pixel PX2e. Therefore, in the above aspect, it is possible to further harmonize the hue in the image after the resolution conversion.

Aspect 3

Further, as illustrated in FIGS. 2 and 5 and the like, among the plurality of first pixels PX1, a first pixel at a start end in the first direction D1 is set as a first start end pixel PX1s, and a first pixel at a terminal end in the first direction D1 is set as a first terminal end pixel PX1e. Among the plurality of second pixels PX2, a second pixel at a start end in the first direction D1 is set as a second start end pixel PX2s, and a second pixel at a terminal end in the first direction D1 is set as a second terminal end pixel PX2e. Among the plurality of second pixels PX2, a second pixel between the second start end pixel PX2s and the second terminal end pixel PX2e in the first direction D1 is set as an intervening pixel PX2b. With reference to a linear correspondence relationship 901 in which coordinates of the first start end pixel PX1s and the second start end pixel PX2s in the first direction D1 are set as an origin and a coordinate of the second terminal end pixel PX2e in the first direction D1 is assigned to a coordinate of the first terminal end pixel PX1e in the first direction D1, a degree to which the datum point P0 is shifted to inside of the input image IM1 in the first direction D1 is set as a shift amount. The datum point determination unit U1 may determine the coordinate of the datum point P0 in the first direction D1 with respect to the intervening pixel PX2b so that the shift amount (for example, a shift amount β) in the intervening pixel PX2b is smaller than the shift amount (for example, an offset amount α) in the second start end pixel PX2s and the second terminal end pixel PX2e.

In the above case, the shift amount (β) in the first direction D1 of the intervening pixel PX2b between the second start end pixel PX2s and the second terminal end pixel PX2e in the converted image IM2 is smaller than the shift amount (α) in the first direction D1 of the second start end pixel PX2s and the second terminal end pixel PX2e in the converted image IM2. As a result, in the first direction D1, the end portion of the converted image IM2 and inside of the converted image IM2 have harmonized hues. Therefore, in the above aspect, it is possible to further harmonize the hue in the image after the resolution conversion.

Further, the same can be applied to the second direction D2 as in the third aspect.

Aspect 4

Figure 4:
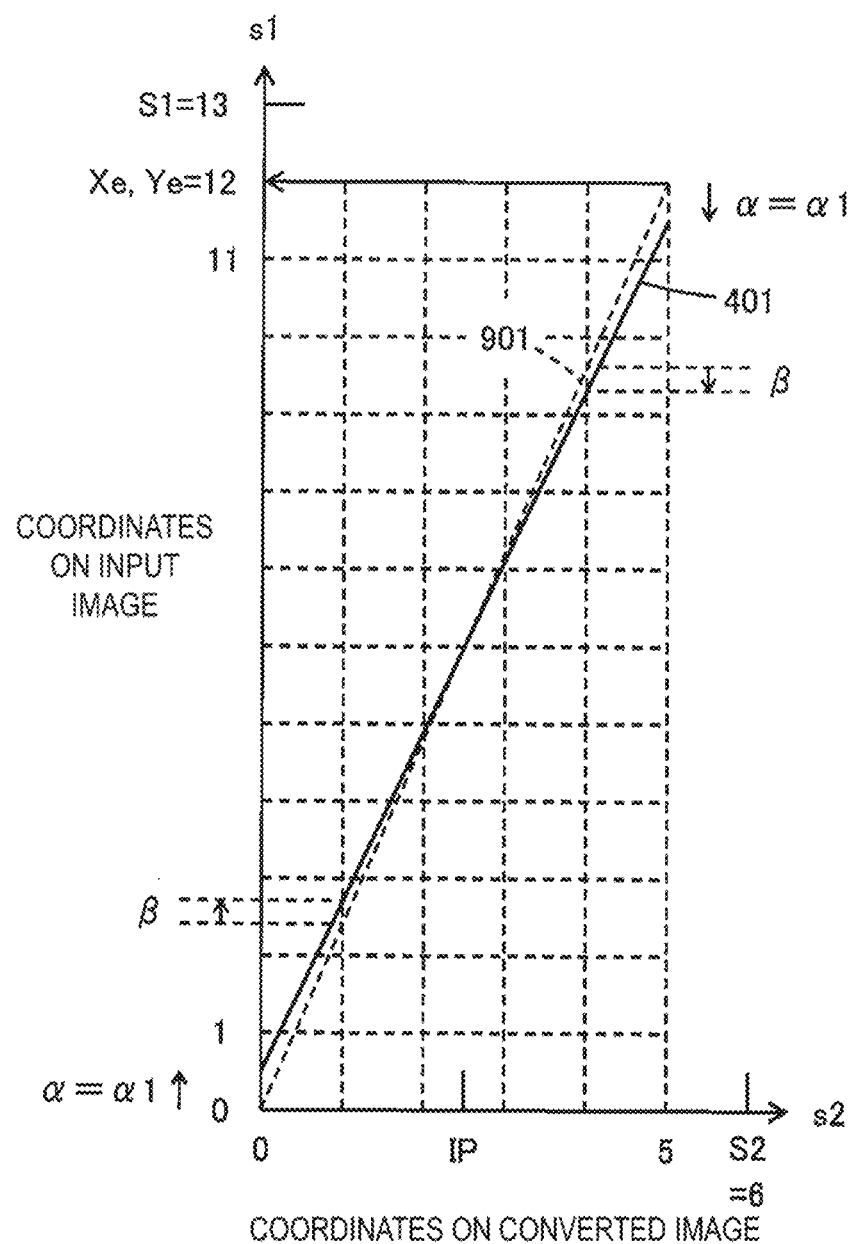
FIG. 4 is a diagram schematically illustrating an example in which coordinates s1 on an input image are converted from coordinates s2 on a converted image in resolution conversion for reducing the number of pixels.
Figure 7:
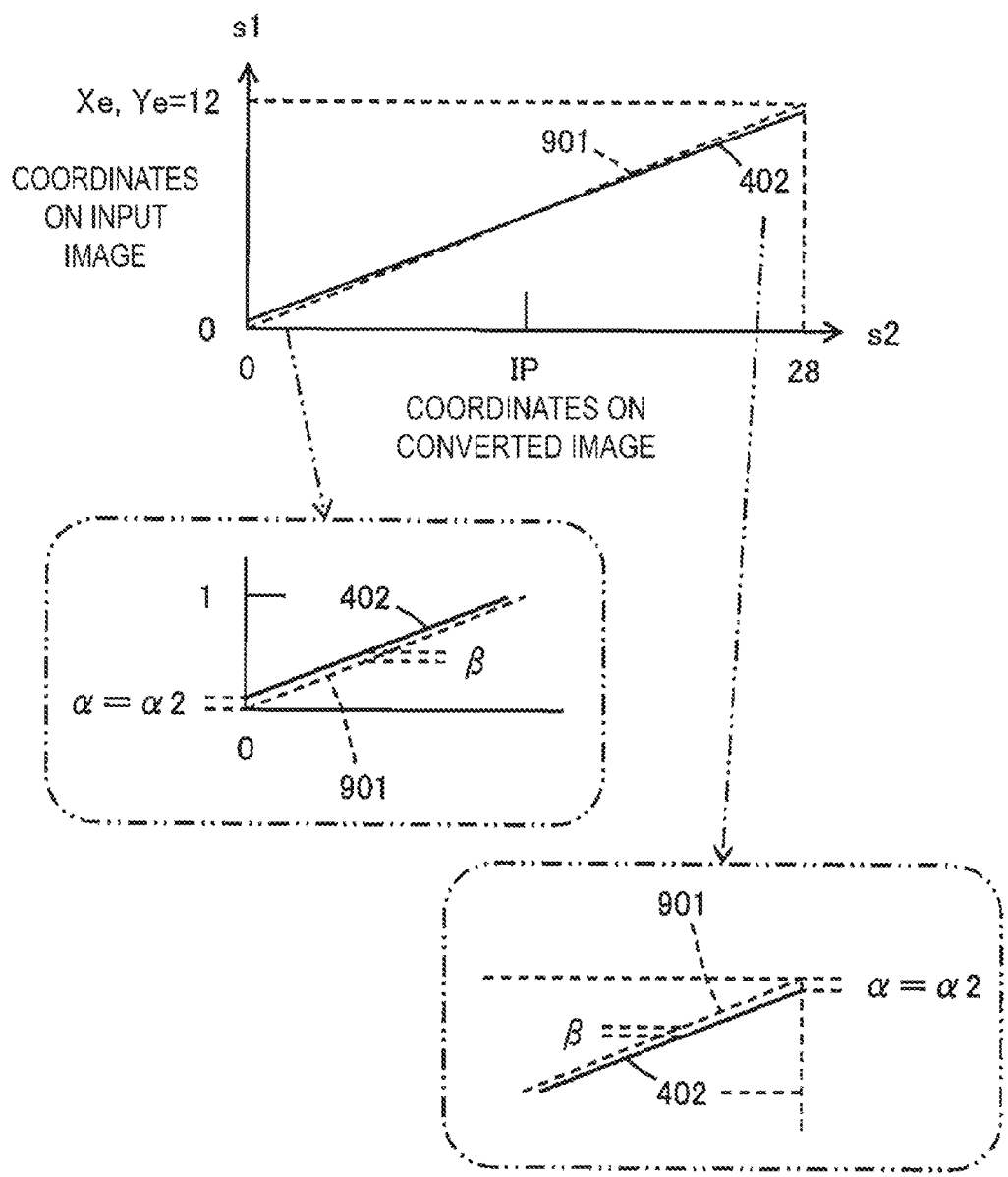
FIG. 7 is a diagram schematically illustrating an example in which coordinates s1 on an input image are converted from coordinates s2 on a converted image in resolution conversion for increasing the number of pixels.

As illustrated in FIGS. 4 and 7, the datum point determination unit U1 may determine the coordinate of the datum point P0 in the first direction D1 with respect to the intervening pixel PX2b so that the shift amount of the second pixel PX2 decreases as the second pixel PX2 becomes closer, in the first direction D1, to an intermediate position P between the second start end pixel PX2s and the second terminal end pixel PX2e.

In the above case, the shift amount decreases as the second pixel PX2 becomes closer to the intermediate position IP between the second start end pixel PX2s and the second terminal end pixel PX2e in the converted image IM2. Thus, in the first direction D1, the converted image IM2 has harmonized hue over the entire region. Therefore, in the above aspect, it is possible to further harmonize the hue in the image after the resolution conversion.

Further, the same can be applied to the second direction D2 as in the fourth aspect.

Aspect 5

Figure 3:
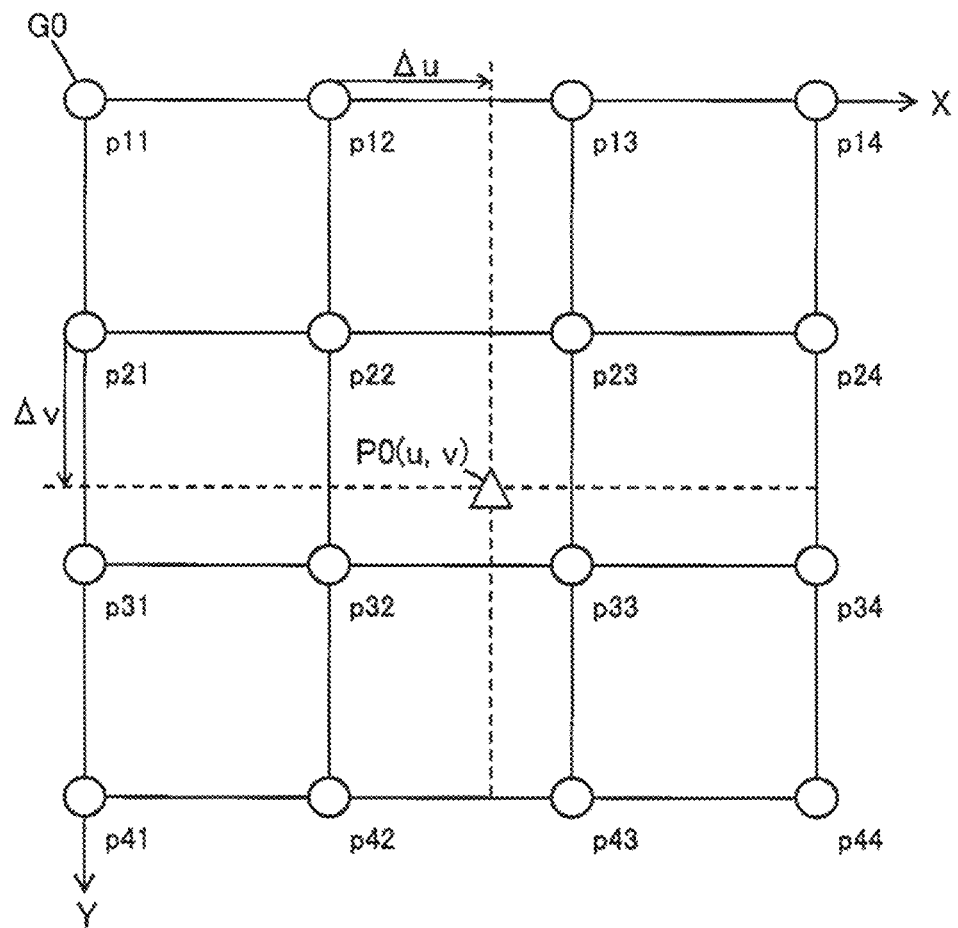
FIG. 3 is a schematic diagram for describing an interpolation operation using a bicubic method used for resolution conversion of an image.

As illustrated in FIG. 3, pixel values of the plurality of reference pixels PX3 may be 16 pixel values p11 to p44 used for an interpolation operation by a bicubic method. The interpolation unit U2 may determine the pixel value p of the second pixel PX2 by performing the interpolation operation using the 16 pixel values p11 to p44. According to the aspect, a high-quality converted image can be obtained.

Aspect 6

When the datum point determination unit U1 performs processing of reducing the number of pixels in the first direction D1 as the image processing as illustrated in FIG. 4, the datum point determination unit U1 determines coordinates in the first direction D1 of the datum point P0 with respect to the second pixels present at both ends in the first direction D1 among the plurality of second pixels PX2 to be coordinates shifted to an inside of the input image IM1 from the first direction end portion coordinates Xs and Xe by 0.5 pixels of the input image IM1. According to the aspect, a high-quality reduced image can be obtained.

Further, the same can be applied to the second direction D2 as in the sixth aspect.

Aspect 7

When the datum point determination unit U1 performs processing of increasing the number of pixels in the first direction D1 as the image processing as illustrated in FIG. 7, the datum point determination unit U1 determines coordinates in the first direction D1 of the datum point P0 with respect to the second pixels present at both ends in the first direction D1 among the plurality of second pixels PX2 to be coordinates shifted to further inside of the input image IM1 from the first direction end portion coordinates Xs and Xe by a distance longer than 0 and shorter than 0.5 pixels of the input image IM1. According to the aspect, a high-quality enlarged image can be obtained.

Further, the same can be applied to the second direction D2 as in the seventh aspect.

Aspect 8

Meanwhile, as illustrated in FIG. 1, a printing system SY1 according to an aspect of the present technology includes the image processing apparatus U0 described above, a print head 220 including a plurality of nozzles capable of discharging liquid to a medium ME1, and a control unit U10 that controls discharge of the liquid from the print head 220 so that a printed image IM3 based on the converted image IM2 is formed on the medium ME1. According to the aspect, it is possible to provide a printing system capable of further harmonizing the hue in the printed image.

Aspect 9

Figure 6:
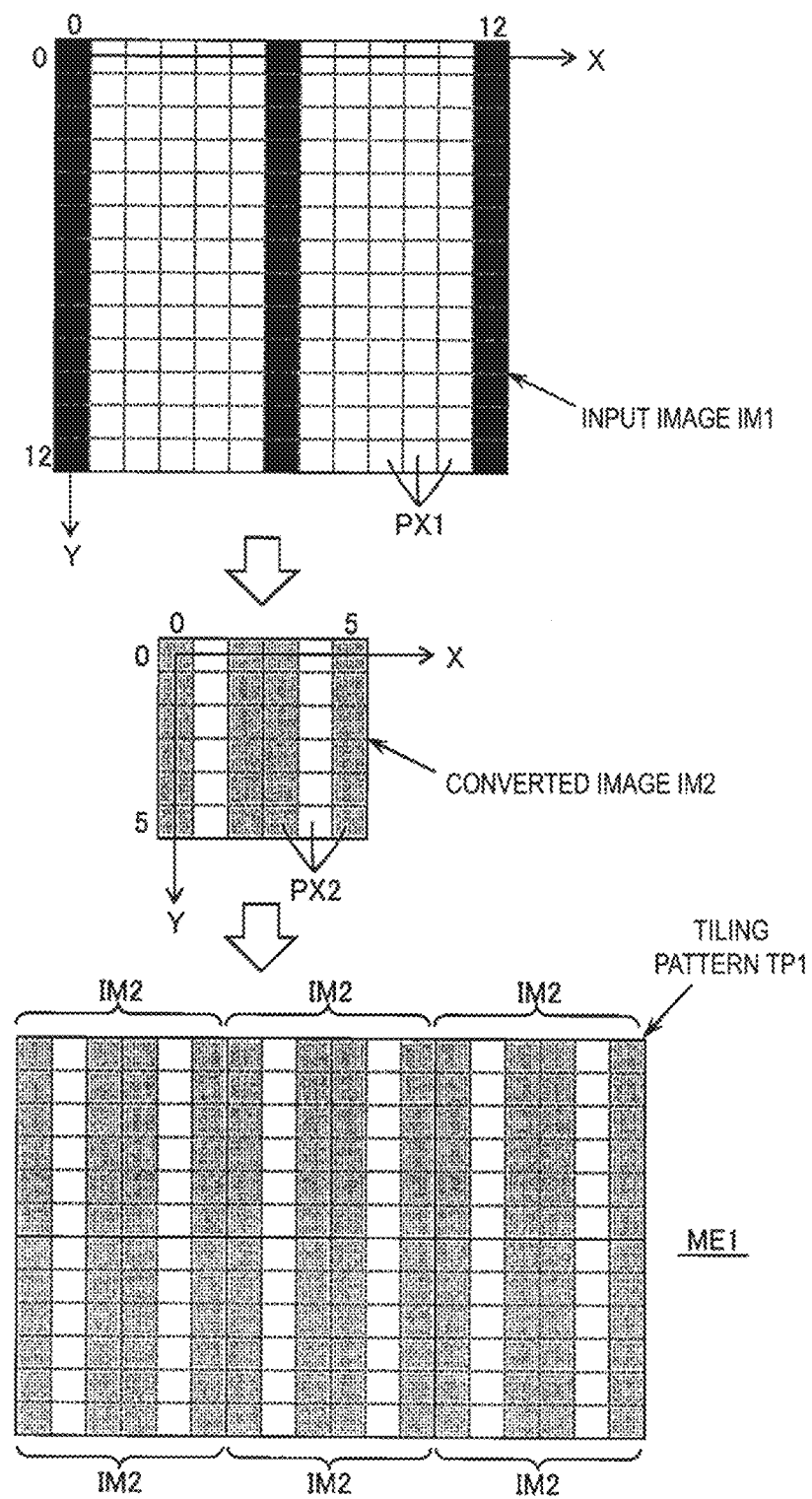
FIG. 6 is a diagram schematically illustrating an example in which a tiling pattern is formed from an input image.

As illustrated in FIG. 6 and the like, the control unit U10 may control the discharge of the liquid from the print head 220 so that a tiling pattern TP1 in which the converted images IM2 are repeatedly arranged adjacent to each other is formed as the printed image IM3 on the medium ME1. Examples of the tiling pattern TP1 include a textile pattern in which a pattern having symmetry in at least one of the first direction D1 and the second direction D2 is repeated as the converted image IM2, and the like.

As described above, in the second start end pixel PX2s and the second terminal end pixel PX2e at the ends opposite to each other in the converted image IM2, strong appearance of the hue of the first pixel PX1 present at the end of the input image IM1 is avoided, and thus, in the tiling pattern TP1, a joint between the converted images IM2 being conspicuous is avoided. Therefore, the printing system SY1 is suitable for solving the problem that the joint between the converted images IM2 is conspicuous in the tiling pattern TP1 in which the converted images IM2 are repeated, and the above-described aspect can print a tiling pattern with good image quality.

Aspect 10

Figure 9:
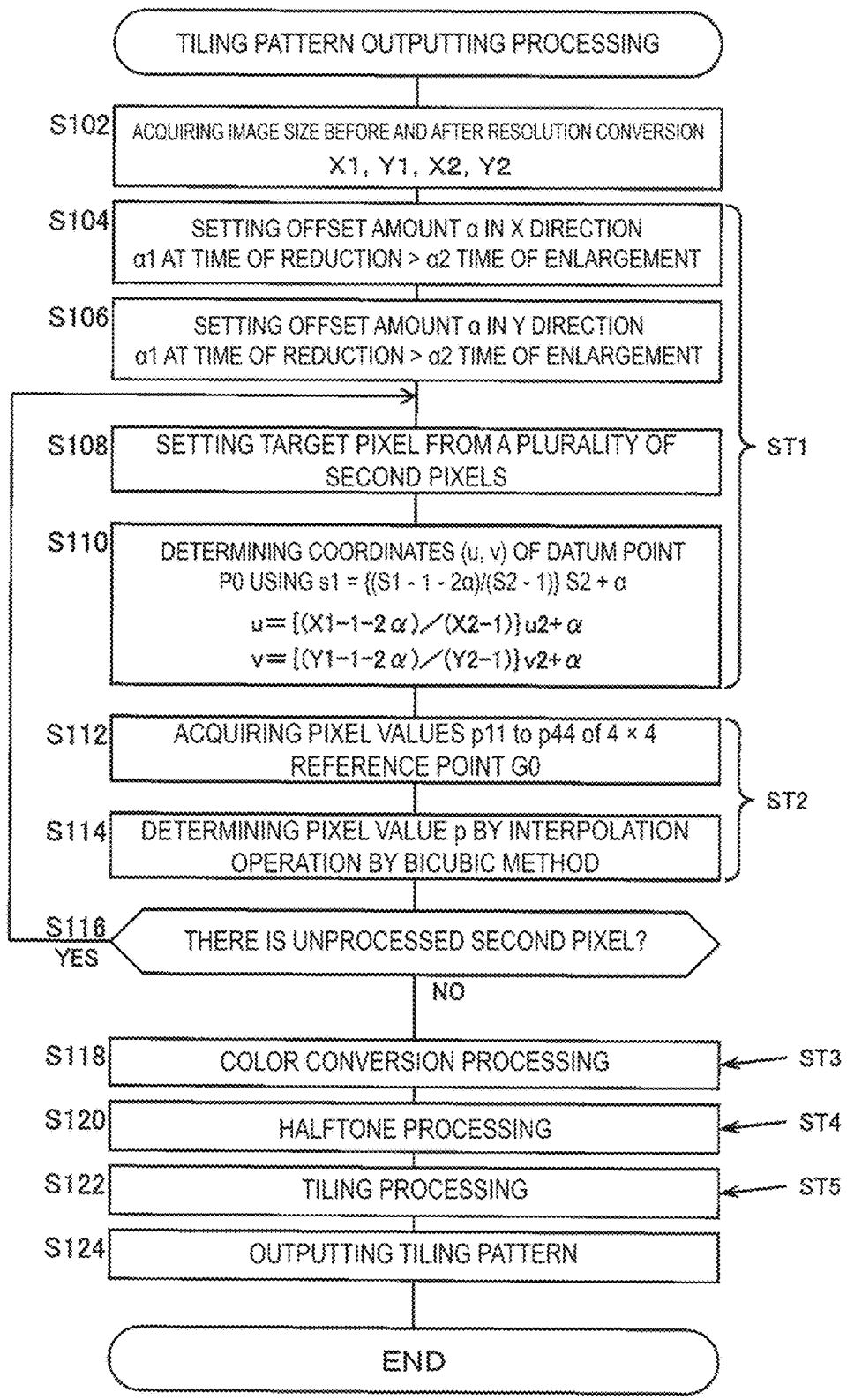
FIG. 9 is a flowchart schematically illustrating an example of tiling pattern outputting processing.

Further, an image processing method according to an aspect of the present technology is an image processing method for acquiring the converted image IM2 by converting resolution of the input image IM1 includes the following steps (A) and (B) as illustrated in FIG. 9.
(A) a datum point determination step ST1 of determining coordinates (u, v) of a datum point P0 for determining pixel values of the second pixels PX2 included in the converted image IM2 in a coordinate plane 300 adjusted to the input image IM1.
(B) an interpolation step ST2 of determining the pixel values of the second pixels PX2 based on pixel values of a plurality of reference pixels PX3 in a predetermined range AR1 with reference to the datum point P0 among the plurality of first pixels PX1.

Here, coordinates in the first direction D1 of the first pixels present at both ends in the first direction D1 among the plurality of first pixels PX1 are set as first direction end portion coordinates Xs, Xe. In the image processing method, in the datum point determination step ST1, coordinates in the first direction D1 of the datum point P0 with respect to the second pixels present at both ends in the first direction D1 among the plurality of second pixels PX2 are determined to be coordinates shifted to further inside of the input image IM1 from the first direction end portion coordinates Xs, Xe by a distance longer than 0 and shorter than one pixel of the input image IM1.

The above aspect can provide an image processing method capable of further harmonizing the hue in the image after the resolution conversion.

The present technique can be further applied to a multi-function device including the image processing apparatus described above, a printing method for the printing system described above, an image processing program for realizing the image processing method described above in a computer, a print control program for the printing system described above, a computer-readable recording medium on which any of the control programs described above has been recorded, and the like. Any of the above-described apparatus may include a plurality of separate units.

(2) SPECIFIC EXAMPLE OF CONFIGURATION OF PRINTING SYSTEM Including Image Processing Apparatus FIG. 1 schematically illustrates a configuration example of a printing system including an image processing apparatus. FIG. 2 schematically illustrates an example of resolution conversion from an input image to a converted image.

A printing system SY1 illustrated in FIG. 1 includes a host device 100 and a printer 200, and can form a tiling pattern TP1 exemplified in FIG. 6 on a medium ME1. The tiling pattern TP1 is a pattern in which the converted images IM2 are repeatedly arranged adjacent to each other, such as a textile pattern in which a symmetrical pattern is repeated as the converted image IM2. The host device 100 includes a CPU 111 that is a processor, a ROM 112, a RAM 113, a storage device 114, an input device 115, a display device 116, a communication I/F 117, and the like. Here, CPU is an abbreviation for a "Central Processing Unit", ROM is an abbreviation for a "Read Only Memory", RAM is an abbreviation for a "Random Access Memory", and I/F is an abbreviation for an interface. The above-described elements (111 to 117) are electrically coupled to each other so that information can be input and output therebetween. The ROM 112, the RAM 113, and the storage device 114 are memories, and at least the ROM 112 and the RAM 113 are semiconductor memories.

The storage device 114 stores an OS (not illustrated), an image processing program PR0, an offset amount α used for the resolution conversion illustrated in FIG. 2, a print control program PR1, and the like. Here, OS is an abbreviation for an operating system. The storage device 114 may be a nonvolatile semiconductor memory such as a flash memory, a magnetic storage device such as a hard disk, or the like. The input device 115 may be a pointing device, a hard key including a keyboard, a touch panel attached to a surface of a display panel, or the like. The display device 116 displays a screen corresponding to display information based on the display information. A liquid crystal display panel or the like can be used for the display device 116. The communication I/F 117 is coupled to a communication I/F 230 in the printer 200 to output and receive information such as print data to and from the printer 200. Communication of the communication I/Fs 117 and 230 may be wired, wireless, or network communication such as LAN or Internet. Here, LAN is an abbreviation of a local area network.

The image processing program PR0 illustrated in FIG. 1 causes the host device 100 to implement a datum point determination function FU1 and an interpolation function FU2. The print control program PR1 illustrated in FIG. 1 causes the host device 100 to implement a color conversion function FU3, a halftone processing function FU4, and a tiling function FU5.

The CPU 111 of the host device 100 reads, into the RAM 113, the information stored in the storage device 114 when appropriate and executes the read program to perform a variety of processing. The CPU 111 executes the program (PR0, PR1) read into the RAM 113 to perform processing corresponding to the above-described functions FU1 to FU5. The image processing program PR0 causes the host device 100, which is a computer, to function as an image processing apparatus U0 including a datum point determination unit U1 and an interpolation unit U2. The print control program PR1 causes the host device 100 to function as a color conversion unit U3, a halftone processing unit U4, and a tiling unit U5. Further, as illustrated in FIG. 9, the host device 100 executing the image processing program PR0 performs a datum point determination step ST1 and an interpolation step ST2. As illustrated in FIG. 9, the host device 100 executing the print control program PR1 performs a color conversion step ST3, a halftone processing step ST4, and a tiling step ST5. The computer readable medium, which stores the program (PR0, PR1) causing the computer to implement the above-described functions FU1 to FU5, is not limited to the storage device inside the host device but may be a recording medium outside the host device.

The host device 100 includes a computer such as a personal computer, a mobile phone such as a smart phone, a digital camera, a digital video camera, and the like. The host device 100 may include all the components 111 to 117 in one housing but may be configured of a plurality of devices divided to be communicable with each other. Moreover, even when at least a part of the printer 200 is in the host device 100, the present technology can be implemented.

The printer 200 illustrated in FIG. 1 is assumed to be an ink jet-type printer that injects a C ink, an M ink, a Y ink, and a K ink from a print head 220 as color materials to form a printed image IM3 corresponding to print data. Here, ink is an example of a liquid, C means cyan, M means magenta, Y means yellow, and K means black. Of course, the printer 200 may be an electrophotographic printer such as a laser printer using toner, a three-dimensional printer, or the like. The print head 220 includes a plurality of nozzles Nc capable of discharging C ink droplets onto the medium ME1, a plurality of nozzles Nm capable of discharging M ink droplets onto the medium ME1, a plurality of nozzles Ny capable of discharging Y ink droplets onto the medium ME1, and a plurality of nozzles Nk capable of discharging K ink droplets onto the medium ME1. The C, M, Y, and K inks are supplied to the print head 220 from ink cartridges Cc, Cm, Cy, and Ck, respectively. As a result, the print head 220 discharges ink droplets 280 of C, M, Y, and K from the nozzles Nc, Nm, Ny, and Nk, respectively. When the ink droplets 280 land on the medium ME1, ink dots are formed on the medium ME1. As a result, printed matter including a printed image IM3 is obtained on the medium ME1.

The medium ME1 is not particularly limited and includes fabrics, paper, resins, metals, and the like on which a textile pattern is printed. A shape of the medium ME1 may be a roll shape, a cut two-dimensional shape, or a three-dimensional shape.

The printer 200 includes a controller 210 that controls discharge of ink from the print head 220. The controller 210 constitutes, together with the host device 100 that executes the print control program PR1, a control unit U10 that controls discharge of ink from the print head 220 so that the printed image IM3 based on the converted image IM2 (refer to FIG. 2) is formed on the medium ME1.

As illustrated in FIG. 2, the input image IM1 has a plurality of first pixels PX1 arranged in an X direction and a Y direction. The X direction and the Y direction are orthogonal to each other, but the X direction and the Y direction may not be orthogonal to each other as long as they intersect each other. In the example illustrated in FIG. 2, the X direction corresponds to a first direction D1, and the Y direction corresponds to a second direction D2. It is also possible to cause the Y direction to correspond to the first direction D1 and the X direction to correspond to the second direction D2. FIG. 2 illustrates that in the input image IM1 as a schematic example, 13 first pixels PX1 are arranged in the X direction (X1=13), and 13 first pixels PX1 are arranged in the Y direction (Y1=13). Of course, the number of pixels X1 may be different from the number of pixels Y1. When a color system of the input image IM1 is RGB, a pixel value of each of the first pixels PX1 is a combination of an R value, a G value, and a B value. Here, R means red, G means green, and B means blue. The R value, the G value, and the B value are represented by gradation values of 0 to 255, for example.

The image processing apparatus U0 acquires a converted image IM2 by converting resolution of the input image IM1. Conversion of resolution of the input image IM1 may be an enlargement in which the number of pixels is increased in order to increase the resolution, a reduction in which the number of pixels is decreased in order to decrease the resolution, or different magnifications in the X direction and the Y direction. Therefore, the conversion of the resolution of the input image IM1 includes, for example, enlargement in which an enlargement ratio in the X direction is larger than an enlargement ratio in the Y direction, reduction in which a reduction ratio in the X direction is larger than a reduction ratio in the Y direction, conversion in which the number of pixels is changed in the Y direction but not changed in the Y direction, conversion in which the number of pixels is increased in the X direction but decreased in the Y direction, and the like. The obtained converted image IM2 has a plurality of second pixels PX2 arranged in the X direction and the Y direction. FIG. 2 illustrates that in the converted image IM2 as a schematic example, six second pixels PX2 are arranged in the X direction (X2=6) and six second pixels PX2 are arranged in the Y direction (Y2=6). Of course, the number of pixels X2 may be different from the number of pixels Y2, and may be X2≥X1 or Y2≥Y1. When the color system of the input image IM1 is RGB, the color system of the converted image IM2 is RGB, and a pixel value of each of the second pixels PX2 is a combination of an R value, a G value, and a B value. The R value, the G value, and the B value are represented by gradation values of 0 to 255, for example.

The image processing apparatus U0 of the specific example performs an interpolation operation for calculating the pixel values of the second pixels PX2 using pixel values of a plurality of reference pixels PX3 based on a datum point P0 corresponding to each of the second pixels PX2 of the converted image IM2. The datum point determination unit U1 included in the image processing apparatus U0 determines coordinates (u, v) of the datum point P0 for determining the pixel values of the second pixels PX2 included in the converted image IM2 on a coordinate plane 300 which is an X-Y coordinate plane adjusted to the input image IM1. The plurality of reference pixels PX3 are first pixels in a predetermined range AR1 based on the datum point P0 among the plurality of first pixels PX1 included in the input image IM1. In FIG. 2, the datum point P0 corresponding to a target pixel PX2t marked with a triangle in the converted image IM2 is marked with a triangle in the input image IM1. The interpolation unit U2 included in the image processing apparatus U0 determines the pixel values of the second pixels PX2 based on the pixel values of the plurality of reference pixels PX3. The interpolation unit U2 of the specific example determines the pixel values of the second pixels PX2 by performing an interpolation operation by a bicubic method using a maximum of 4×4 pixels including a position of the datum point P0 among the plurality of first pixels PX1 as the reference pixels PX3. The interpolation operation may be an interpolation operation by a bilinear method or the like in addition to the interpolation operation by the bicubic method. Therefore, the plurality of reference pixels PX3 are not limited to 4×4 pixels and may be 2×2 pixels or the like.

For convenience, pixels on the X-Y coordinate plane will be referred to as follows according to their positions.

Among the plurality of first pixels PX1 included in the input image IM1, a first pixel at a start end in the X direction is set as a first start end pixel PX1s, and a first pixel at a terminal end in the X direction is set as a first terminal end pixel PX1e. In FIG. 2, the first pixels PX1 (a thick line portion) arranged in the X direction in the input image IM1 are extracted to the lower side and illustrated. In addition, among the plurality of first pixels PX1, a first pixel between the first start end pixel PX1s and the first terminal end pixel PX1e in the X direction is set as an intervening pixel PX1b. X coordinates of the first start end pixel PX1s and the first terminal end pixel PX1e present at both ends in the X direction among the plurality of first pixels PX1 are set as first direction end portion coordinates Xs and Xe, respectively. The X coordinate is a coordinate in the X direction. The first direction end portion coordinate Xs of the first start end pixel PX1s is 0, and the first direction end portion coordinate Xe of the first terminal end pixel PX1e is X1−1.

Among the plurality of first pixels PX1 included in the input image IM1, a first pixel at a start end in the Y direction is set as a first start end pixel PX1s, and a first pixel at a terminal end in the Y direction is set as a first terminal end pixel PX1e. In FIG. 2, the first pixels PX1 (a thick line portion) arranged in the Y direction in the input image IM1 are extracted to the right side and illustrated. In addition, among the plurality of first pixels PX1, a first pixel between the first start end pixel PX1s and the first terminal end pixel PX1e in the Y direction is set as an intervening pixel PX1b. Y coordinates of the first start end pixel PX1 and the first terminal end pixel PX1s present at both ends in the Y direction among the plurality of first pixels PX1e are set as second direction end portion coordinates Ys and Ye, respectively. The Y coordinate is a coordinate in the Y direction. The second direction end portion coordinate Ys of the first start end pixel PX1s is 0, and the second direction end portion coordinate Ye of the first start end pixel PX1s is Y1−1.

Among the plurality of second pixels PX2 included in the converted image IM2, the second pixel at the start end in the X direction is set as a second start end pixel PX2s, and the second pixel at the terminal end in the X direction is set as a second terminal end pixel PX2e. In FIG. 2, the second pixels PX2 (a thick line portion) arranged in the X direction in the converted image IM2 are extracted to the lower side and illustrated. In addition, among the plurality of second pixels PX2, a second pixel between the second start end pixel PX2s and the second terminal end pixel PX2e in the X direction is set as an intervening pixel PX2b. In the X-Y coordinate plane aligned with the converted image IM2 as illustrated in a lower portion of FIG. 2, an X coordinate of the second start end pixel PX2s is 0, and an X coordinate of the second terminal end pixel PX2e is X2−1.

Among the plurality of second pixels PX2 included in the converted image IM2, the second pixel at the start end in the Y direction is set as a second start end pixel PX2s, and the second pixel at the terminal end in the Y direction is set as a second terminal end pixel PX2e. In FIG. 2, the second pixels PX2 (a thick line portion) arranged in the Y direction in the converted image IM2 are extracted to the right side and illustrated. In addition, among the plurality of second pixels PX2, a second pixel between the second start end pixel PX2s and the second terminal end pixel PX2e in the Y direction is set as an intervening pixel PX2b. In the X-Y coordinate plane aligned with the converted image IM2 as illustrated in the lower portion of FIG. 2, a Y coordinate of the second start end pixel PX2s is 0, and a Y coordinate of the second terminal end pixel PX2e is Y2−1.

The datum point determination unit U1 of the specific example determines the X coordinate of the datum point P0 with respect to the second start end pixel PX2s and the second terminal end pixel PX2e to be coordinates shifted to further inside of the input image IM1 from the first direction end portion coordinates Xs and Xe by a distance longer than 0 and shorter than one pixel in the input image IM1 in the X direction. In addition, the datum point determination unit U1 determines the Y coordinate of the datum point P0 with respect to the second start end pixel PX2s and the second terminal end pixel PX2e to be coordinates shifted to further inside of the input image IM1 from the second direction end portion coordinates Ys and Ye by a distance longer than 0 and shorter than one pixel in the input image IM1 in the Y direction. Details of the datum point determination unit U1 will be described later.

First, with reference to FIG. 3, an interpolation operation by a bicubic method used for resolution conversion of an image will be described. Here, in the X-Y coordinate plane, the coordinates of the datum point P0 are (u, v), a numerical value after a decimal point of the X coordinate u is Δu, a numerical value after a decimal point of the Y coordinate v is Δv, and the pixel values of 4×4 reference points G0 around the datum point P0 are p11 to p44. The datum point P0 is included in a square surrounded by the reference point G0 of the pixel value p22, the reference point G0 of the pixel value p23, the reference point G0 of the pixel value p33, and the pixel value p32 of the reference point G0. Each of the reference points G0 corresponds to a reference pixel PX3 included in the input image IM1 when the reference point G0 is present in the input image IM1. For the reference point G0 outside the input image IM1 among 16 reference points G0, the pixel value is applied on the assumption that a pixel having the pixel value of the first pixel PX1 at an edge portion of the input image IM1 is present outside the input image IM1.

A pixel value p after interpolation is calculated by the following Equation.

[Equation 1]

$$p = [W(y1) \ W(y2) \ W(y3) \ W(y4)] \begin{bmatrix} p11 & p21 & p31 & p41 \\ p12 & p22 & p32 & p42 \\ p13 & p23 & p33 & p43 \\ p14 & p24 & p34 & p44 \end{bmatrix} \begin{bmatrix} W(x1) \\ W(x2) \\ W(x3) \\ W(x4) \end{bmatrix} \quad (1)$$

-continued

HOWEVER $x1 = 1 + \Delta u$ $x2 = \Delta u$ $x3 = 1 - \Delta u$ $x4 = 2 - \Delta u$ $y1 = 1 + \Delta v$ $y2 = \Delta v$ $y3 = 1 - \Delta v$ $y4 = 2 - \Delta v$ Variables x1, x2, x3, and x4 indicate distances in the X direction from the datum point P0 to the reference points G0, and variables y1, y2, y3, and y4 indicate distances in the Y direction from the datum point P0 to the reference points G0. Here, when a variable t is any one of the variables x1, x2, x3, x4, y1, y2, y3, and y4, a function W(t) is calculated by the following Equation.

[Equation 2]

$W(t)=(a+2)|t|^3-(a+3)|t|^2+1$  ($|t|\leq 1$)

$W(t)=a|t|^3-5a|t|^2+8a|t|-4a$  ($1<|t|<2$)

$W(t)=0$  ($2\leq |t|$)  (2)

A constant a is typically set to −0.5 or −0.75. Interpolation characteristics can be changed by changing a value of the constant a.

The image processing apparatus U0 can calculate a pixel value p of the target pixel PX2t corresponding to the datum point P0 by performing an interpolation operation using the pixel values p11 to p44 of maximum 4×4 reference pixels PX3 in a predetermined range AR1 with reference to the datum point P0 according to above Equations (1) and (2).

Figure 14:
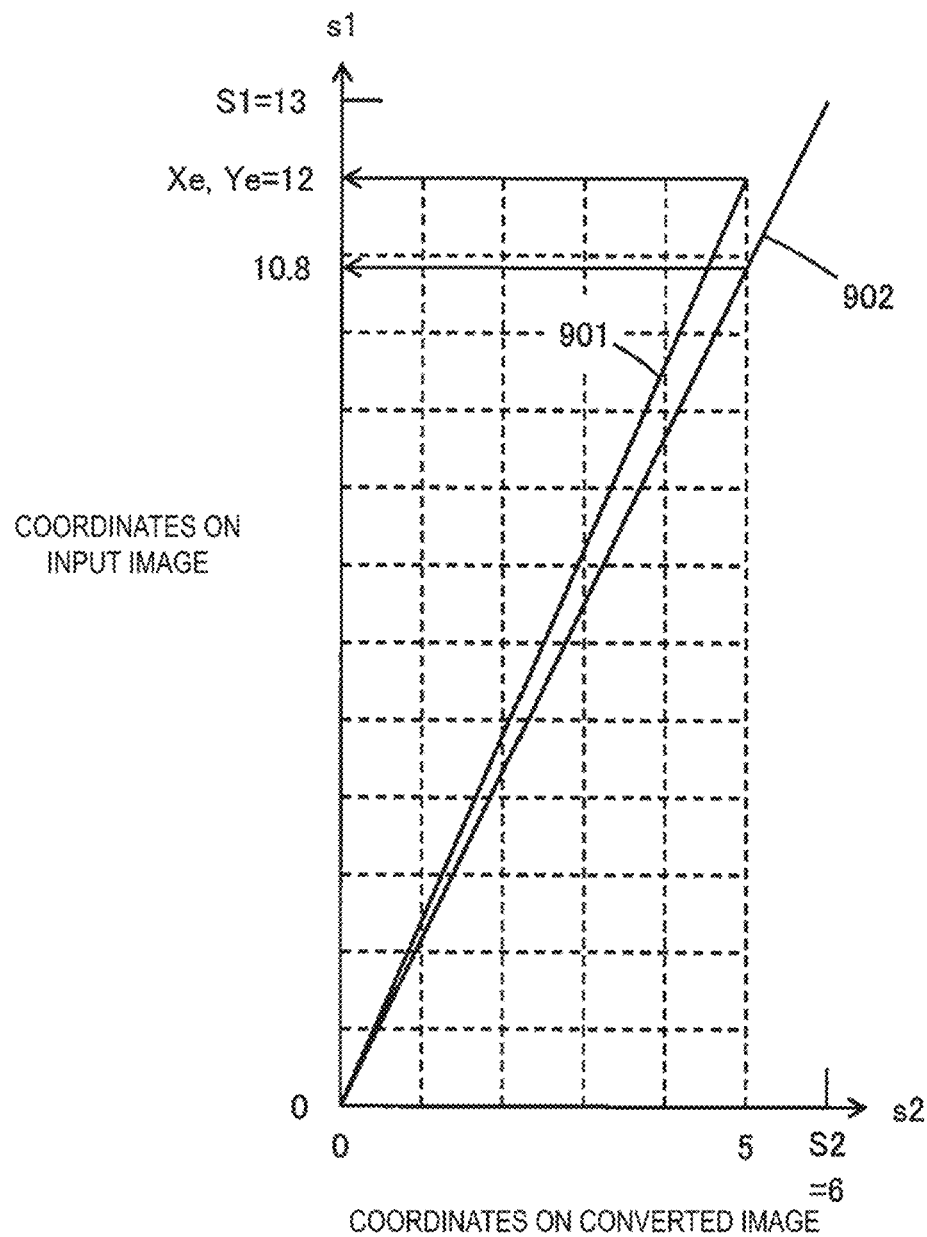
FIG. 14 is a diagram schematically illustrating a comparative example in which coordinates s1 on an input image are converted from coordinates s2 on a converted image.

Here, a comparative example for determining the coordinates (u, v) of the datum point P0 will be described with reference to FIG. 14. FIG. 14 schematically illustrates a comparative example in which a coordinate s1 on the input image is converted from a coordinate s2 on the converted image. The coordinate conversion is performed for each of the X coordinate and the Y coordinate. Therefore, the X coordinate on the converted image is converted into an X coordinate u of the datum point P0, and the Y coordinate on the converted image is converted into a Y coordinate v of the datum point P0.

A linear correspondence relationship 901 illustrated in FIG. 14 is a correspondence relationship in which (s2, s1)=(0, 0) and (s2, s1)=(S2−1, S1−1) are coupled to each other by a straight line. Here, the number of pixels S1 is the number of pixels in the X direction or the Y direction of the input image, and the number of pixels S2 is the number of pixels in the X direction or the Y direction of the converted image. The number of pixels S1 in the X direction corresponds to the number of pixels X1 illustrated in FIG. 2, the number of pixels S1 in the Y direction corresponds to the number of pixels Y1 illustrated in FIG. 2, the number of pixels S2 in the X direction corresponds to the number of pixels X2 illustrated in FIG. 2, and the number of pixels S2 in the Y direction corresponds to the number of pixels Y2 illustrated in FIG. 2. The X coordinate X1−1 on the input image is the first direction end portion coordinate Xe, and the Y coordinate Y1−1 on the input image is the second direction end portion coordinate Ye. The linear correspondence relationship 901 is indicated by the following Equation.

$s1=\{(S1-1)/(S2-1)\}\times s2$  (3)

As described above, the X coordinate 0 on the converted image is converted into the X coordinate 0 on the input image, and the Y coordinate 0 on the converted image is converted into the Y coordinate 0 on the input image. Further, when calculation errors due to integer processing or the like do not occur, an X coordinate X2−1 on the converted image is converted into an X coordinate Xe=X1−1 on the input image, and a Y coordinate Ye=Y2−1 on the converted image is converted into a Y coordinate Y1−1 on the input image. Therefore, for example, the coordinates on the input image of the datum point P0 corresponding to an origin (0, 0) on the converted image are the origin (0, 0), and when there are no calculation errors, the coordinates on the input image of the datum point P0 corresponding to a terminal point (X2−1, Y2−1) on the converted image are a terminal point (X1−1, Y1−1). Since calculation errors due to integer processing or the like vary according to a size (X1, Y1) of the input image IM1 and the magnification of the resolution conversion, variation occurs in the coordinates of the datum point P0 on the input image corresponding to the terminal point (X2−1, Y2−1) on the converted image.

A linear correspondence relationship 902 illustrated in FIG. 14 is a correspondence relationship in which (s2, s1)=(0, 0) and (s2, s1)=(S2, S1) are coupled by a straight line. Here, the coordinate S2 on the converted image is outside the converted image, and the coordinate S1 on the input image is outside the input image. The linear correspondence relationship 902 is indicated by the following Equation.

$s1=(S1/S2)\times s2$  (4)

As described above, the X coordinate 0 on the converted image is converted into the X coordinate 0 on the input image, and the Y coordinate 0 on the converted image is converted into the Y coordinate 0 on the input image. Further, when calculation errors due to integer processing or the like do not occur, the X coordinate X2−1 on the converted image is converted into an X coordinate (S1/S2)×(X1−1) on the input image, and the Y coordinate Y2−1 on the converted image is converted into an Y coordinate (S1/S2)×(Y1−1) on the input image. Therefore, for example, the coordinates on the input image of the datum point P0 corresponding to the origin (0, 0) on the converted image are the origin (0, 0), and when there are no calculation errors, the coordinates on the input image of the datum point P0 corresponding to a terminal point (X2−1, Y2−1) on the converted image are ((S1/S2)×(X1−1), (S1/S2)×(Y1−1)). Variation occurs in the coordinates on the input image of the datum point P0 corresponding to a terminal point (X2−1, Y2−1) on the converted image.

Figure 15:
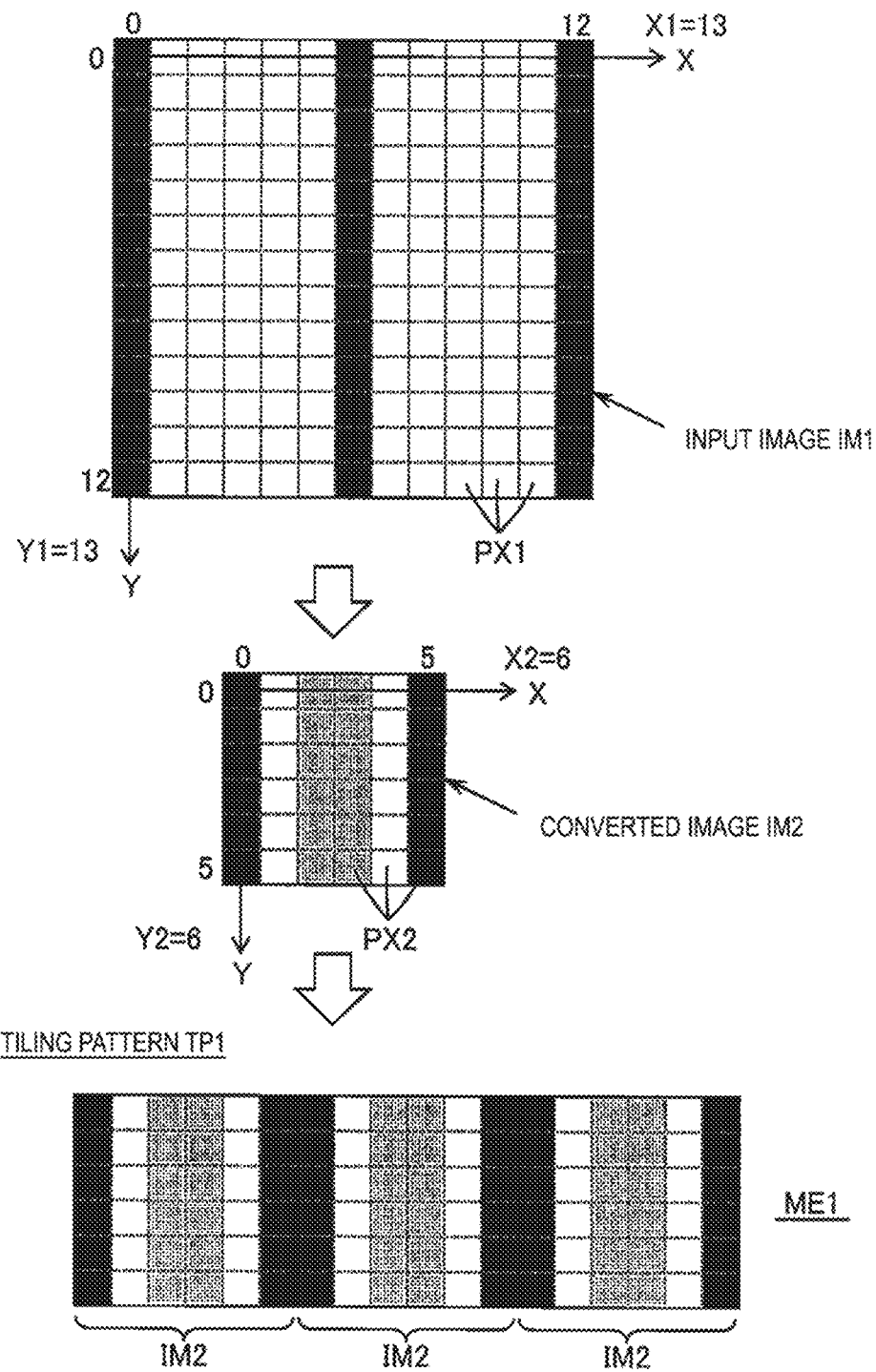
FIG. 15 is a diagram schematically illustrating a comparative example in which a tiling pattern is formed from an input image.

In the interpolation operation by the bicubic method, when the datum point P0 is aligned with the position of the pixel of the input image, a pixel value of a pixel corresponding to the datum point P0 in the converted image becomes a pixel value of a pixel at the position of the datum point P0 in the input image. For example, it is assumed that the coordinates of the datum point P0 are calculated in accordance with the linear correspondence relationship 901, and the datum point P0 corresponding to the origin (0, 0) and the terminal point (X2−1, Y2−1) in the converted image is the position of the pixel of the input image. In this case, hue of a pixel present in an edge portion of the converted image strongly appears as hue of a pixel present in an edge portion of the input image. Here, as illustrated in FIG. 15, it is assumed that the input image IM1 is a stripe image of a vertical stripe shape having symmetry in the X direction and the Y direction. In this case, the hue of the second pixels PX2 present on two sides of the converted image IM2 in the Y direction strongly appears as the hue of the first pixels PX1 present on two sides of the input image IM1 in the Y direction. As a result, in the converted image IM2, a difference in the hue between the second pixels PX2 present on the two sides in the Y direction and the second pixels PX2 present on the inner side occurs. When the first pixels PX1 present on the two sides of the input image IM1 in the Y direction are of a dark color, a density of the second pixels PX2 present on the two sides of the converted image IM2 in the Y direction strongly appears as a density of the first pixels PX1 present on the two sides of the input image IM1 in the Y direction.

In particular, as illustrated in the lower part of FIG. 15, when a tiling pattern TP1 such as a textile pattern in which the converted images IM2 are repeatedly arranged adjacent to each other is formed on the medium ME1, the hue, for example, the density of a joint between the converted images IM2 is conspicuous in the tiling pattern TP1. Of course, as illustrated in FIG. 15, a tiling pattern in which the converted images IM2 are repeatedly arranged adjacent to each other in the Y direction may be formed. Although not illustrated, when the input image IM1 is a stripe image of a horizontal stripe shape having symmetry in the X direction and the Y direction, a similar difference in the hue occurs, and in a tiling pattern in which the converted images IM2 are repeatedly arranged adjacent to each other in the Y direction, the hue, for example, the density of a joint between the converted images IM2 is conspicuous.

Figure 16:
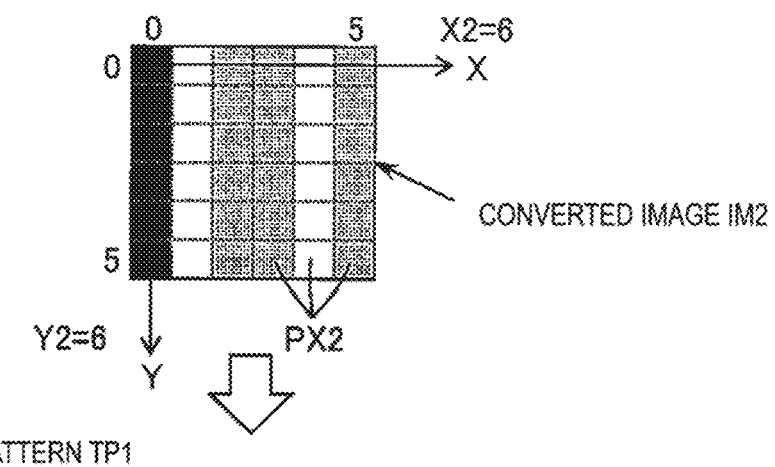
FIG. 16 is a diagram schematically illustrating a comparative example in which a tiling pattern is formed from a converted image.
Figure 16:
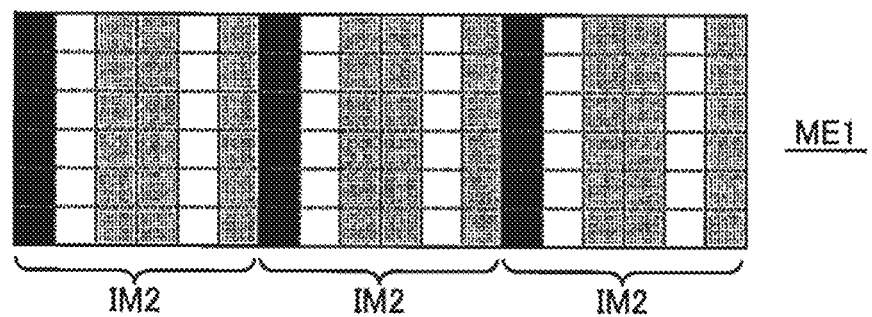

Further, when variation occurs in the coordinates on the input image of the datum point P0 corresponding to the terminal point (X2−1, Y2−1) on the converted image, the datum point P0 corresponding to the origin (0, 0) in the converted image is the position of the pixel of the input image. In this case, the hue of the pixels present on two sides passing through the origin in the converted image strongly appear as the hue of the pixels present on two sides passing through the origin in the input image. When the input image IM1 is a stripe image having a vertical stripe shape, as illustrated in FIG. 16, the hue of the second pixel PX2 present at a side having the X coordinate of 0 in the converted image IM2 strongly appears as the hue of the first pixel PX1 present at a side having the X coordinate of 0 in the input image IM1. As a result, in the converted image IM2, a difference in the hue between the second pixel PX2 present on the side having the X coordinate of 0 and the second pixel PX2 present on the inner side occurs. In the converted image IM2, the hue of the second pixel PX2 present at a side at which the X coordinate is the maximum value changes according to the size (X1, Y1) of the input image IM1 and the magnification of the resolution conversion.

In particular, as illustrated in a lower portion of FIG. 16, when the tiling pattern TP1 in which the converted images IM2 are repeatedly arranged adjacent to each other is formed on the medium ME1, the hue, for example, the density of the joint between the converted images IM2 is conspicuous in the tiling pattern TP1. Although not illustrated, when the input image IM1 is a stripe image having a horizontal stripe shape, a similar difference in the hue occurs, and in a tiling pattern in which the converted images IM2 are repeatedly arranged adjacent to each other in the Y direction, the hue, for example, the density of the joint between the converted images IM2 is conspicuous.

The datum point determination unit U1 of the specific example determines the coordinates (u, v) of the datum point P0 corresponding to the origin and the terminal point of the converted image IM2 to be coordinates shifted to inside of the input image IM1 within a range of less than one pixel with reference to the linear correspondence relationship 901 illustrated in FIG. 14.

FIG. 4 schematically illustrates an example in which a coordinate s1 on the input image IM1 is converted from a coordinate s2 on the converted image IM2 in the resolution conversion for reducing the number of pixels. The description below is given by also referring to FIG. 2. The coordinate conversion is performed for each of the X coordinate and the Y coordinate. Therefore, the X coordinate on the converted image IM2 is converted into the X coordinate u of the datum point P0, and the Y coordinate on the converted image IM2 is converted into the Y coordinate v of the datum point P0.

The linear correspondence relationship 901 is indicated by $s1=\{(S1-1)/(S2-1)\} \times s2$ as illustrated in above Equation (3). When attention is paid to the X coordinate, the linear correspondence relationship 901 is a linear correspondence relationship in which the coordinate X2−1 of the second terminal end pixel PX2e in the X direction is assigned to the coordinate Xe=X1−1 of the first terminal end pixel PX1e in the X direction with the coordinates of the first start end pixel PX1s and the second start end pixel PX2s in the X direction as an origin 0. When attention is paid to the Y coordinate, the linear correspondence relationship 901 is a linear correspondence relationship in which the coordinate of the second terminal end pixel PX2e in the Y direction is assigned to the coordinate Ye of the first terminal end pixel PX1e in the Y direction with the coordinates of the first start end pixel PX1s and the second start end pixel PX2s in the Y direction as an origin 0.

The datum point determination unit U1 of the specific example sets the offset amount α to 0<α<1, and determines the coordinates 0 of the datum point P0 with respect to the second start end pixel PX2s and the second terminal end pixel PX2e to be coordinates shifted by α pixels of the input image IM1 to inside of the input image IM1 from the first start end pixel PX1s and the first terminal end pixel PX1e. When attention is paid to the X coordinate, the datum point determination unit U1 determines the X coordinate 0 of the datum point P0 with respect to the second start end pixel PX2s to be a coordinate α shifted to inside of the input image IM1 from the first start end pixel PX1s by α pixels of the input image IM1 in the X direction. In addition, the datum point determination unit U1 determines the X coordinate Xe of the datum point P0 with respect to the second terminal end pixel PX2e to be a coordinate Xe−α shifted to inside of the input image IM1 from the first terminal end pixel PX1e by α pixels of the input image IM1 in the X direction. When attention is paid to the Y coordinate, the datum point determination unit U1 determines the Y coordinate 0 of the datum point P0 with respect to the second start end pixel PX2s to be a coordinate α shifted to inside of the input image IM1 from the first start end pixel PX1s in the Y direction by α pixels of the input image IM1. In addition, the datum point determination unit U1 determines the Y coordinate Ye of the datum point P0 with respect to the second terminal end pixel PX2e to be a coordinate Ye−α shifted to inside of the input image IM1 from the first terminal end pixel PX1e by α pixels of the input image IM1 in the Y direction.

A correspondence relationship 401 in which the offset amount α is added to the linear correspondence relationship 901 is indicated by the following Equation.

$$s1=\{(S1-1-2\alpha)/(S2-1)\}\times s2+\alpha \quad (5)$$

The calculation is performed, for example, in a floating-point number or a fixed-point number so that the coordinates of the datum point P0 with respect to the second start end pixel PX2s and the second terminal end pixel PX2e do not match the coordinates of the first pixel PX1 included in the input image IM1.

When attention is paid to the X coordinate, the correspondence relationship 401 is indicated by the following Equation.

$$u=\{(X1-1-2\alpha)/(X2-1)\}\times u2+\alpha \quad (6)$$

However, the X coordinate u2 is the X coordinate of the target pixel PX2t on the X-Y coordinate plane adjusted to the converted image IM2. When the input image IM1 has symmetry in the X direction, the converted image IM2 also has symmetry in the X direction by applying above Equation (6).

When attention is paid to the Y coordinate, the correspondence relationship 401 is indicated by the following Equation.

$$v=\{(Y1-1-2\alpha)/(Y2-1)\}\times v2+\alpha \quad (7)$$

However, the Y coordinate v2 is the Y coordinate of the target pixel PX2t on the X-Y coordinate plane adjusted to the converted image IM2. When the input image IM1 has symmetry in the Y direction, the converted image IM2 also has symmetry in the Y direction by applying above Equation (7).

Here, an amount by which the datum point P0 is shifted to inside of the input image IM1 with reference to the linear correspondence relationship 901 is defined as a shift amount. Equation (6) indicating the correspondence relationship 401 illustrated in FIG. 4 indicates a linear correspondence relationship in which the shift amount of the second pixel PX2 decreases as the second pixel PX2s becomes closer, in the X direction, to an intermediate position IP between the second start end pixel PX2s and the second terminal end pixel PX2e. The datum point determination unit U1 determines the X coordinate of the datum point P0 using above Equation (6). Therefore, the datum point determination unit U1 determines the X coordinate of the datum point P0 with respect to the second start end pixel PX2s, the intervening pixel PX2b, and the second terminal end pixel PX2e so that the shift amount of the second pixel PX2 decreases as the second pixel becomes closer to the intermediate position IP in the X direction. Therefore, the datum point determination unit U1 determines the coordinates of the datum point P0 in the X direction with respect to the intervening pixel PX2b so that the shift amount β in the intervening pixel PX2b is smaller than the offset amount α in the second start end pixel PX2s and the second terminal end pixel PX2e.

Further, Equation (7) indicating the correspondence relationship 401 illustrated in FIG. 4 indicates a linear correspondence relationship in which the shift amount of the second pixel PX2 decreases as the second pixel PX2 becomes closer, in the Y direction, to an intermediate position IP between the second start end pixel PX2s and the second terminal end pixel PX2e. The datum point determination unit U1 determines the Y coordinate of the datum point P0 using above Equation (7). Therefore, the datum point determination unit U1 determines the Y coordinate of the datum point P0 with respect to the second start end pixel PX2s, the intervening pixel PX2b, and the second terminal end pixel PX2e so that the shift amount of the second pixel PX2 decreases as the second pixel becomes closer to the intermediate position IP in the Y direction. Therefore, the datum point determination unit U1 determines the coordinate of the datum point P0 in the Y direction with respect to the intervening pixel PX2b so that the shift amount β in the intervening pixel PX2b is smaller than the offset amount α in the second start end pixel PX2s and the second terminal end pixel PX2e.

In FIG. 4, an offset amount α1 is illustrated as the offset amount α used for the resolution conversion for reducing the number of pixels. Preferably, the offset amount α1 is 0.5. When α1=0.5, the datum point determination unit U1 determines the coordinates in the X and Y directions of the datum points P0 with respect to the second pixels present at both ends in the X and Y directions among the plurality of second pixels PX2 to be coordinates shifted to inside of the input image IM1 from the first direction end portion coordinates Xs, Xe by 0.5 pixels of the input image IM1. Hereinafter, referring to FIG. 5, the reason why α1=0.5 is preferable will be described.

FIG. 5 schematically illustrates the datum point P0 and the reference point G0 with respect to the second pixel PX2 at a corner portion of the converted image IM2 in the resolution conversion for reducing the number of pixels.

For example, the coordinates (u, v) of the datum point P0 with respect to the target pixel PX2t located at the origin (0, 0) in the converted image IM2 are (α1, α1). When α1=0.5, the reference points having large weights among the 16 reference points G0 are four reference points present at (0, 0), (0, 1), (1, 0), and (1, 1). As a result, a color of the target pixel PX2t becomes a color close to a color obtained by averaging colors of the four reference points, and is not limited to a color of the first pixel PX1 located at the origin (0, 0) in the input image IM1. The coordinates (u, v) of the datum point P0 with respect to the second pixel PX2 at the terminal point (X2−1, Y2−1) in the converted image IM2 are (Xe−1, Ye−1). When α1=0.5, the reference points having the larger weights among the 16 reference points G0 are four reference points present at (Xe, Ye), (Xe, Ye−1), (Xe−1, Ye), and (Xe−1, Ye−1). Thus, the color of the second pixel PX2 at the terminal point in the converted image IM2 becomes a color close to the color obtained by averaging the colors of the four reference points, and is not limited to the color of the first pixel PX1 at the terminal point (Xe, Ye) in the input image IM1.

The same can be applied to the second pixel PX2 located at (0, Y2−1) or (X2−1, 0) in the converted image IM2.

The color of the intervening pixel PX2b of which the X coordinate is 0 in the X-Y coordinate plane adjusted to the converted image IM2 becomes a color close to the color obtained by averaging the color of the intervening pixel PX1b of which the X coordinate is 0 and the color of the intervening pixel PX1b of which the X coordinate is 1 in the X-Y coordinate plane adjusted to the input image IM1. The color of the intervening pixel PX2b of which the X coordinate is X2−1 in the X-Y coordinate plane adjusted to the converted image IM2 is a color close to the color obtained by averaging the color of the intervening pixel PX1b of which the X coordinate is Xe and the color of the intervening pixel PX1b of which the X coordinate is Xe−1 in the X-Y coordinate plane adjusted to the input image IM1.

The color of the intervening pixel PX2b of which the Y coordinate is 0 in the X-Y coordinate plane adjusted to the converted image IM2 is a color close to the color obtained by averaging the color of the intervening pixel PX1b of which the Y coordinate is 0 and the color of the intervening pixel PX1b of which the Y coordinate is 1 in the X-Y coordinate plane adjusted to the input image IM1. The color of the intervening pixel PX2b of which the Y coordinate is Y2−1 in the X-Y coordinate plane adjusted to the converted image IM2 is a color close to the color obtained by averaging the color of the intervening pixel PX1b of which the X coordinate is Ye and the color of the intervening pixel PX1b of which the Y coordinate is Ye−1 in the X-Y coordinate plane adjusted to the input image IM1.

As described above, in the second pixels PX2 present on four sides of the converted image IM2, strong appearance of the hue of the first pixels PX1 present on the four sides of the input image IM1 and on the inner side by one pixel is avoided. Thus, due to α1=0.5, a high-quality reduced image is obtained. In addition, since the same offset amount α1 is applied to the datum points P0 at both end portions in the X direction, when the color of each of the first pixels PX1 of the input image IM1 has symmetry in the X direction, a high-quality converted image IM2 having symmetry is obtained. Since the same offset amount α1 is applied to the datum points P0 at both end portions in the Y direction, when the color of each of the first pixels PX1 of the input image IM1 has symmetry in the Y direction, a high-quality converted image IM2 having symmetry is obtained.

FIG. 6 schematically illustrates a state in which the input image IM1 which is a stripe image of a vertical stripe shape having symmetry in the X direction and the Y direction is reduced and then the tiling pattern TP1 is formed.

As illustrated in FIG. 6, as for the hue of the second pixels PX2 present on the two sides of the converted image IM2 in the Y direction, the intensity of the hue of the first pixels PX1 present on the two sides of the input image IM1 in the Y direction is suppressed. As a result, in the converted image IM2, a difference in the hue between the second pixels PX2 present on the two sides in the Y direction and the second pixels PX2 present on the inner side is suppressed. As illustrated in FIG. 6, when the first pixels PX1 present on the two sides of the input image IM1 in the Y direction have a dark color, the density of the second pixels PX2 present on the two sides of the converted image IM2 in the Y direction is suppressed. The same can be applied to a case in which the input image IM1 is a stripe image of a horizontal stripe shape having symmetry in the X direction and the Y direction. Therefore, the resolution conversion of the specific example can further harmonize the hue in the converted image.

As described above, when the tiling pattern TP1 such as a textile pattern in which the converted images IM2 are repeatedly arranged adjacent to each other is formed on the medium ME1 as illustrated in the lower portion of FIG. 6, the hue of the joint between the converted images IM2 in the tiling pattern TP1 is not conspicuous.

FIG. 7 schematically illustrates an example in which the coordinate s1 on the converted image IM2 is converted from the coordinate s2 on the input image IM1 in the resolution conversion for increasing the number of pixels. The description below is given by also referring to FIG. 2. The coordinate conversion is performed for each of the X coordinate and the Y coordinate. In FIG. 7, an offset amount α2 is illustrated as the offset amount α used for the resolution conversion for increasing the number of pixels.

A correspondence relationship 402 in which the offset amount α2 is added to the linear correspondence relationship 901 is indicated by the following Equation.

$$s1=\{(S1-1-2\alpha 2)/(S2-1)\}\times s2+\alpha 2 \tag{8}$$

When attention is paid to the X coordinate, the correspondence relationship 402 is indicated by the following Equation.

$$u=\{(X1-1-2\alpha 2)/(X2-1)\}\times u2+\alpha 2 \tag{9}$$

When attention is paid to the Y coordinate, the correspondence relationship 402 is indicated by the following Equation.

$$v=\{(Y1-1-2\alpha 2)/(Y2-1)\}\times v2+\alpha 2 \tag{10}$$

Equation (9) indicating the correspondence relationship 402 illustrated in FIG. 7 indicates a linear correspondence relationship in which the shift amount of the second pixel PX2 decreases as the second pixel PX2 becomes closer, in the X direction, to the intermediate position IP between the second start end pixel PX2s and the second terminal end pixel PX2e. The datum point determination unit U1 determines the X coordinate of the datum point P0 with respect to the second start end pixel PX2s, the intervening pixel PX2b, and the second terminal end pixel PX2e so that the shift amount of the second pixel PX2 decreases as the second pixel becomes closer to the intermediate position IP in the X direction. Therefore, the datum point determination unit U1 determines the coordinate of the datum point P0 in the X direction with respect to the intervening pixel PX2b so that the shift amount β in the intervening pixel PX2b is smaller than the offset amount α2 in the second start end pixel PX2s and the second terminal end pixel PX2e. Similarly, the datum point determination unit U1 determines the coordinate of the datum point P0 in the Y direction with respect to the intervening pixel PX2b so that the shift amount β in the intervening pixel PX2b is smaller than the offset amount α2 in the second start end pixel PX2s and the second terminal end pixel PX2e.

It is preferable that the offset amount α2 when the number of pixels is increased is smaller than the offset amount α1 when the number of pixels is decreased, and 0<α2<0.5 is preferred. FIG. 7 illustrates the correspondence relationship 402 when α2=0.125. When 0<α2<0.5, the datum point determination unit U1 determines that the coordinates in the X and Y directions of the datum point P0 with respect to the second pixels present at both ends in the X and Y directions among the plurality of second pixels PX2 to be coordinates shifted to inside of the input image IM1 from the first direction end portion coordinates Xs, Xe by a distance longer than 0 and shorter than 0.5 pixels of the input image IM1. The reason why 0<α2<0.5 is preferable will be described below with reference to FIG. 8.

Figure 8:
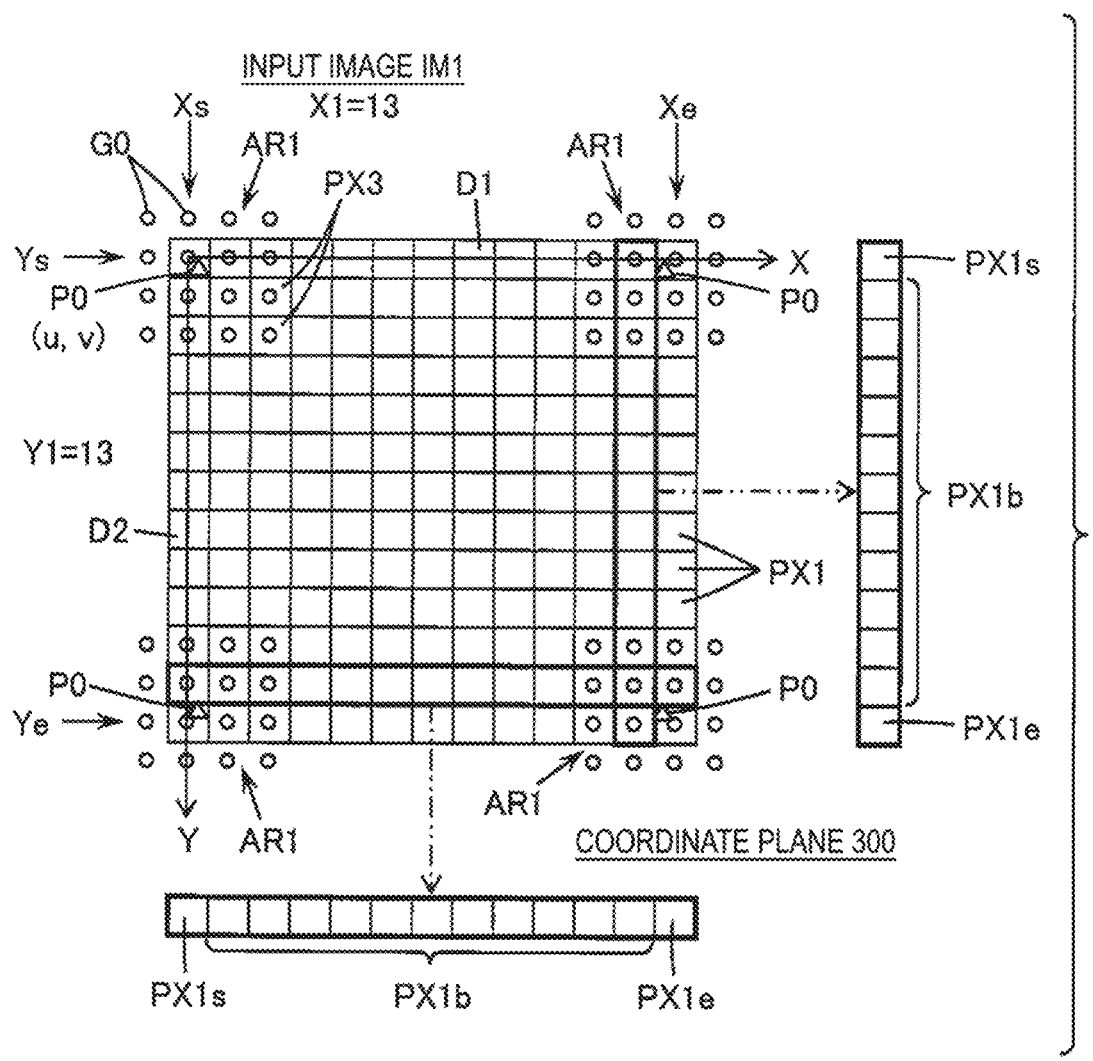
FIG. 8 is a diagram schematically illustrating an example of a datum point and a reference point for a second pixel at a corner portion of a converted image in resolution conversion for increasing the number of pixels.

FIG. 8 schematically illustrates the datum point P0 and the reference point G0 with respect to the second pixel PX2 located at the corner portion of the converted image IM2 in the resolution conversion for increasing the number of pixels.

For example, the coordinates (u, v) of the datum point P0 with respect to the second pixel PX2 located at the origin (0, 0) in the converted image IM2 are (α2, α2). When the number of pixels increases in the resolution conversion, an interval between the datum points P0 and each of the second pixels PX2 becomes narrower than an interval between the first pixels PX1 in the input image IM1. Assuming that the offset amount α2 is 0.5, the color of the second pixel PX2 at the origin becomes a color close to a color obtained by averaging colors of the four reference points G0 present at (0, 0), (0, 1), (1, 0), and (1, 1), and becomes a color deviated from the color of the first pixel PX1 located at the origin (0, 0) of the input image IM1. When the offset amount α2 is set to be smaller than 0.5, the coordinates (u, v) of the datum point P0 with respect to the second pixel PX2 at the origin become closer to the origin (0, 0), and a color of an end portion of the converted image IM2 becomes closer to a color of an end portion of the input image IM1 before enlargement. However, when the offset amount α2 is set to 0, the color of the second pixel PX2 at the origin is limited to a color of the first pixel PX1 at the origin (0, 0) and becomes conspicuous. Therefore, the offset amount α2 is set to be larger than 0 and shorter than 0.5.

The same can be applied to the second pixel PX2 at the terminal point (X2−1, Y2−1), (0, Y2−1) or (X2−1, 0) in the converted image IM2.

The color of the intervening pixel PX2b having the X coordinate of 0 in the X-Y coordinate plane adjusted to the converted image IM2 is close to a color of the first pixel PX1, of which the X coordinate is 0, in the X-Y coordinate plane adjusted to the input image IM1 before enlargement. Since the offset amount α2 is larger than 0, the color of the intervening pixel PX2b of which the X coordinate is 0 is not conspicuous. The same can be applied to the intervening pixel PX2b of which the X coordinate is X2−1 and the intervening pixel PX2b of which the Y coordinate is 0 or Y2−1.

Therefore, when 0<α2<0.5, a high-quality enlarged image can be obtained.

As described above, the magnification for resolution conversion of the input image IM1 may be different between the X direction and the Y direction. For example, when the number of pixels is decreased in the X direction and the number of pixels is increased in the Y direction, the datum point determination unit U1 may apply above Equation (6) with the offset amount α set to α1 for the X direction, and may apply above Equation (10) with the offset amount α set to α2 for the Y direction. When the number of pixels is changed in the Y direction without changing the number of pixels in the X direction, the datum point determination unit U1 may align the coordinates (u, v) of the datum point P0 with the coordinates of the first pixel PX1 in the X direction, may set the offset amount α to α1 in the Y direction, and may apply above Equation (7) or may apply above Equation (10) in which the offset amount α is α2.

(3) SPECIFIC EXAMPLE OF TILING PATTERN OUTPUTTING PROCESSING

FIG. 9 schematically illustrates tiling pattern outputting processing in which the tiling pattern TP1 is output from the input image IM1. Hereinafter, the tiling pattern outputting processing will be described with reference to FIGS. 1 to 8.

The tiling pattern outputting processing of the specific example is performed by the host device 100 illustrated in FIG. 1. The tiling pattern outputting processing starts when the host device 100 receives a user operation for causing the printer 200 to print the tiling pattern TP1 at the input device 115. Here, Steps S104 to S110 correspond to a datum point determination step ST1, a datum point determination unit U1, and a datum point determination function FU1. Steps S112 to S114 correspond to an interpolation step ST2, an interpolation unit U2, and an interpolation function FU2. Step S118 corresponds to a color conversion step ST3, a color conversion unit U3, and a color conversion function FU3. Step S120 corresponds to a halftone processing step ST4, a halftone processing unit U4, and a halftone processing function FU4. Step S122 corresponds to a tiling step ST5, a tiling unit U5, and a tiling function FU5. In the following description, the word "Step" is omitted, and a reference numeral corresponding to a step may be written in parentheses.

When the tiling pattern outputting processing is started, the host device 100 acquires image sizes before and after the resolution conversion (S102). As illustrated in FIG. 2, the image size includes the number of pixels X1 of the input image IM1 in the X direction, the number of pixels Y1 of the input image IM1 in the Y direction, the number of pixels X2 of the converted image IM2 in the X direction, and the number of pixels Y2 of the converted image IM2 in the Y direction. When the color system of the input image IM1 is RGB, the pixel value of each of the first pixels PX1 is a combination of an R value, a G value, and a B value.

Next, the host device 100 sets an offset amount α in the X direction (S104). When X2<X1, the offset amount α1 (refer to FIG. 4) at the time of reduction is set because the resolution conversion for reducing the number of pixels is performed to lower the resolution. When X2>X1, the offset amount α2 (refer to FIG. 7) at the time of enlargement is set because the resolution conversion for increasing the number of pixels is performed to increase the resolution. As described above, α2<α1. When X2=X1, since the resolution conversion is not performed, α=0 may be set.

Further, the host device 100 sets an offset amount α in the Y direction (S106). When Y2<Y1, since resolution conversion for reducing the number of pixels is performed, the offset amount α1 at the time of reduction is set. When Y2>Y1, since resolution conversion for increasing the number of pixels is performed, the offset amount α2 at the time of enlargement is set. When Y2=Y1, since the resolution conversion is not performed, α=0 may be set.

After the offset amount a is set, the host device 100 sets the target pixel PX2t from among the plurality of second pixels PX2 to be the converted image IM2 (S108). This processing may be processing for setting coordinates (u2, v2) of the target pixel PX2t.

Next, the host device 100 determines the coordinates (u, v) of the datum point P0 using above Equation (5) (S110). When the resolution conversion on the X coordinate is performed, the host device 100 calculates the X coordinate u of the datum point P0 using above Equation (6), that is, $u=\{(X1-1-2\alpha)/(X2-1)\} \times u2+\alpha$. When the resolution conversion on the Y coordinate is performed, the host device 100 calculates the Y coordinate v of the datum point P0 using above Equation (7), that is, $v=\{(Y1-1-2\alpha)/(Y2-1)\} \times v2+\alpha$. Of course, $\alpha=\alpha1$ when the resolution conversion for decreasing the number of pixels is performed, and $\alpha=\alpha2$ when the resolution conversion for increasing the number of pixels is performed.

As described above, the datum point determination unit U1 determines the X and Y coordinates of the datum point P0 with respect to the target pixel PX2t so that the shift amount (α or β) in the second pixel PX2 decreases as the second pixel PX2 becomes closer, in the X and Y directions, to the intermediate position IP between the second start end pixel PX2s and the second terminal end pixel PX2e.

Next, the host device 100 acquires pixel values P11 to P44 (refer to FIG. 3) of 4×4 reference points G0 with reference to the datum point P0 among the plurality of first pixels PX1 included in the input image IM1 (S112). Each of the reference points G0 is located in a predetermined range AR1 used for the interpolation operation by the bicubic method with reference to the datum point P0. When the color system of the input image IM1 is RGB, the host device 100 acquires the pixel values p11 to p44 for each of an R value, a G value, and a B value.

Next, the host device 100 calculates a pixel value p of the target pixel PX2*t* by performing the interpolation operation by the bicubic method using the pixel values p11 to p44 (S114). When the color system of the input image IM1 is RGB, the host device 100 calculates the pixel value p for each of the R value, the G value, and the B value.

As described above, the interpolation unit U2 determines the pixel value p of the second pixel PX2 based on the pixel values of the plurality of reference pixels PX3 in the predetermined range AR1 with reference to the datum point P0 among the plurality of first pixels PX1.

After the pixel value p is determined, the host device 100 branches the processing according to whether there is an unprocessed second pixel PX2 for which the pixel value p has not been determined (S116). When there is an unprocessed second pixel PX2, the host device 100 repeats the processing from S108 to S116. Thus, the pixel value p is determined for all the second pixels PX2 that become the converted image IM2. When the converted image IM2 having the pixel value p is generated in all of the second pixels PX2, the host device 100 advances the processing to S118.

In S118, the host device 100 performs color conversion processing in which the converted image IM2 is converted into ink amount data having an integer value of, for example, $2^8$ gradations of C, M, Y, and K. The color conversion processing of S118 may be processing of converting the R value, G value, and B value of each of the second pixels PX2 into ink amount data, for example, with reference to a color conversion lookup that defines a correspondence relationship between gradation values of the R, G, and B and gradation values of C, M, Y, and K.

Next, the host device 100 reduces the number of gradation levels of the gradation values by performing predetermined halftone processing on the gradation value of each of the pixels constituting the ink amount data, and generates halftone data (S120). As the halftone processing, halftone processing by a dither method, halftone processing by an error diffusion method, halftone processing by a density pattern method, or the like can be used. The halftone data may be binary data indicating whether a dot is formed, or may be multivalued data for three gradations or more that can correspond to dots of different sizes such as small, medium, and large dots.

Next, the host device 100 performs tiling processing for generating a tiling pattern in which the halftone datasets are repeatedly arranged adjacent to each other in the X and Y directions (S122). The tiling pattern data is data for forming, on the medium ME1, the tiling pattern TP1 in which the converted images IM2 are repeatedly arranged close to each other in the X and Y directions as the printed image IM3.

Then, the host device 100 transmits the tiling pattern data to the printer 200 to cause the printer 200 to print the tiling pattern TP1 as illustrated in FIG. 6 (S124), and ends the tiling pattern outputting processing. The printer 200 that has received the tiling pattern data causes the print head 220 to discharge ink droplets so that the tiling pattern TP1 is formed on the medium ME1 based on the tiling pattern data.

As described above, the control unit U10 including a color conversion unit U3, a halftone processing unit U4, and a tiling unit U5 controls the discharge of ink from the print head 220 so that the tiling pattern TP1 is formed on the medium ME1.

When the printer 200 can perform the tiling processing, the host device 100 may transmit the halftone data to the printer 200, and the printer 200 that receives the halftone data may perform the tiling processing. When the printer 200 can also perform the halftone processing, the host device 100 may transmit the ink amount data to the printer 200, and the printer 200 that receives the ink amount data may perform the halftone processing. When the printer 200 can also perform the color conversion processing, the host device 100 may transmit the converted image IM2 to the printer 200, and the printer 200 that receives the converted image IM2 may perform the color conversion processing.

When attention is paid to an edge portion of each of the converted images IM2, the coordinates in the X and Y directions of the datum point P0 of the second start end pixel PX2*s* and the second terminal end pixel PX2*e* (refer to FIG. 2) are coordinates shifted to inside of the input image IM1 from coordinates of an end portion of the input image IM1 by a pixel of the offset amount α which is 0<α<1. Thus, in the second start end pixel PX2*s* and the second terminal end pixel PX2*e*, strong appearance of the hue of the first pixel PX1 present at the end portion of the input image IM1 is avoided. Therefore, in the image processing of the specific example, it is possible to further harmonize the hue in the image after the resolution conversion.

When attention is paid to the tiling pattern TP1, it is avoided that the hue of the first pixel PX1 present at the end portion of the input image IM1 appears strongly in the second start end pixel PX2*s* and the second terminal end pixel PX2*e*, and thus it is avoided that the joint between the converted images IM2 is conspicuous in the tiling pattern TP1. Therefore, in the specific example, it is possible to print the tiling pattern TP1 with good image quality. In particular, when the tiling pattern TP1 is a textile pattern in which a pattern having symmetry in at least one of the X direction and the Y direction is repeated as the converted image IM2, each of the converted images IM2 has symmetry. As a result, the hue of the joint between the converted images IM2 is matched in the tiling pattern TP1, and the tiling pattern TP1 with good image quality is formed on the medium ME1.

Conditions for the second start end pixel PX2*s* and the second terminal end pixel PX2*e* in the X direction of the converted image IM2 to have the same pixel value are as follows.

The first pixels PX1 at the X coordinate Xs=0 and the X coordinate Xe all have the same pixel value (referred to as q1), the first pixels PX1 at the X coordinate Xs+1 and the X coordinate Xe−1 all have the same pixel value (referred to as q2), and the first pixels PX1 at the X coordinate Xs+2 and the X coordinate Xe−2 all have the same pixel value (referred to as q3).

The pixel values of the second start end pixel PX2*s* and the second terminal end pixel PX2*e* are not limited to q1, and for example, when q1<q2 and q1<q3, the pixel values are larger than q1.

Conditions for the second start end pixel PX2*s* and the second terminal end pixel PX2*e* in the Y direction of the converted image IM2 to have the same pixel value are as follows.

The first pixels PX1 at the Y coordinate Ys=0 and the Y coordinate Ye all have the same pixel value (referred to as q1), the first pixels PX1 at the Y coordinate Ys+1 and the Y coordinate Ye−1 all have the same pixel value (referred to as q2), and the first pixels PX1 at the Y coordinate Ys+2 and the Y coordinate Ye−2 all have the same pixel value (referred to as q3).

Similarly, the pixel values of the second start end pixel PX2s and the second terminal end pixel PX2e are not limited to q1, and for example, when q1<q2 and q1<q3, the pixel values are larger than q1.

As described above, the image processing apparatus U0 acquires the converted image IM2 by converting the resolution of the input image IM1 satisfying the above conditions so that the second start end pixel PX2s and the second terminal end pixel PX2e have the same pixel value.

(4) VARIOUS APPLICATION EXAMPLES

Figure 10:
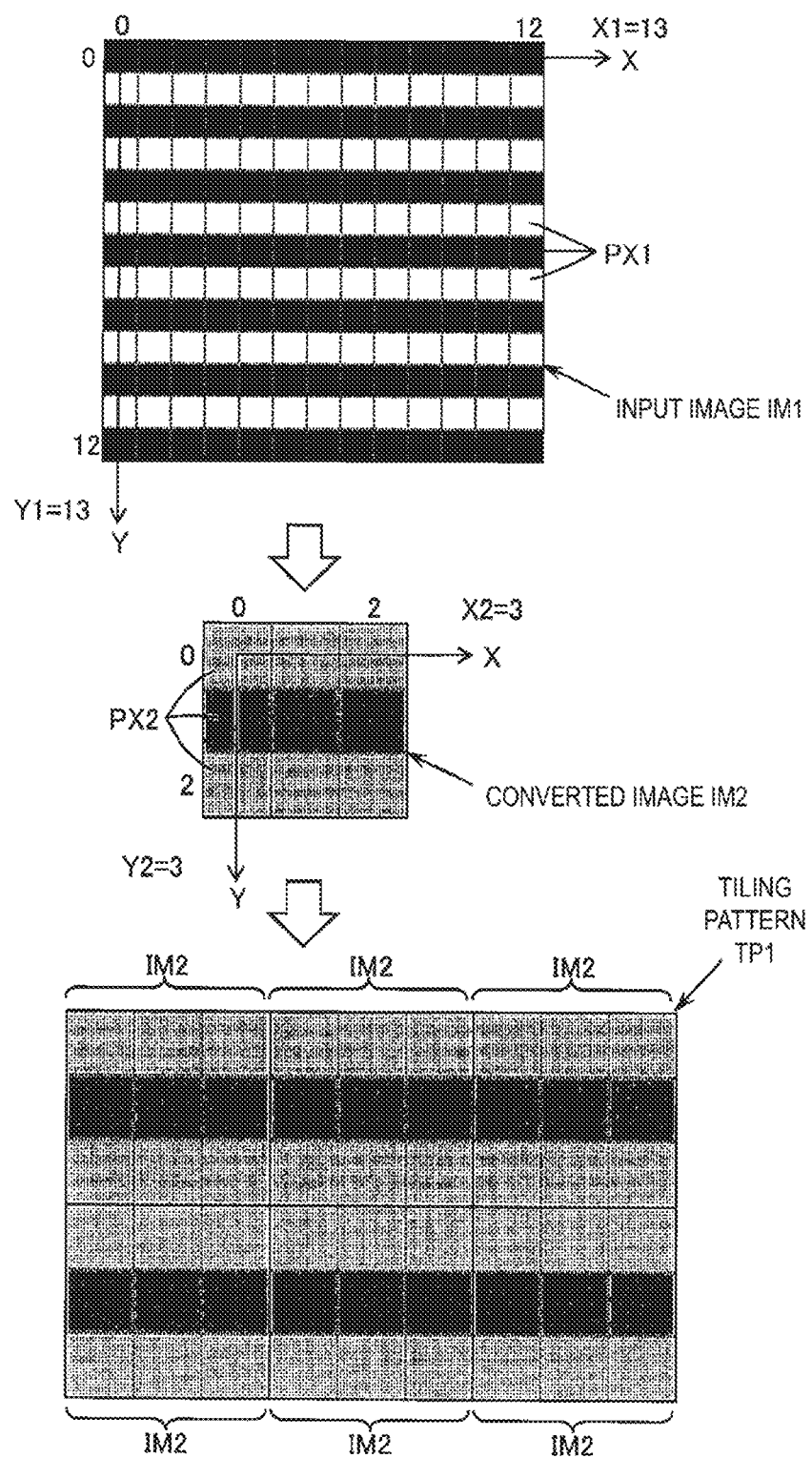
FIG. 10 is a diagram schematically illustrating an example in which a tiling pattern is formed from a stripe image of one pixel line.

FIG. 10 schematically illustrates an application example in which the tiling pattern TP1 is formed from the input image IM1 which is a stripe image of one pixel line.

The input image IM1 illustrated in FIG. 10 has an image size of X1=Y1=13 pixels, all the pixel values of the first pixels PX1 of which the Y coordinate is an even number are gradation values indicating black, and all the pixel values of the first pixels PX1 of which the Y coordinate is an odd number are gradation values indicating white. When the color system of the input image IM1 is RGB, the pixel values (the R value, the G value, and the B value) of the first pixels PX1 of which the Y coordinate is an even number are, for example, 0, and the pixel values (the R value, the G value, and the B value) of the first pixels PX1 of which the Y coordinate is an odd number are, for example, 255. The input image IM1 illustrated in FIG. 10 is a stripe image of a horizontal stripe shape in which one black pixel line in the X direction and one white pixel line in the X direction are alternately arranged in the Y direction. Therefore, the input image IM1 has symmetry in the X direction and the Y direction. The converted image IM2 illustrated in FIG. 10 has an image size of X2=Y2=3 pixels.

As illustrated in FIG. 10, the second pixel PX2 at the Y coordinate Ys=0 and the Y coordinate Ye=2 in the converted image IM2 has a color between the one black pixel line and the one white pixel line in the input image IM1, and all the second pixels have the same color. When the offset amount α1 is 0.5, the second pixel PX2 at the Y coordinate Ys=0 and the Y coordinate Ye=2 in the converted image IM2 has a color close to an intermediate color between the one black pixel line and the one white pixel line in the input image IM1. In the converted image IM2, all the second pixels PX2 at the Y coordinate 1 have the same color, and have a color darker than the second pixels PX2 at the Y coordinate Ys=0 and the Y coordinate Ye=2. Therefore, the converted image IM2 is a stripe image of a horizontal stripe shape in which one relatively light pixel line in the X direction and one relatively dark pixel line in the X direction are alternately arranged in the Y direction, and has symmetry in the X direction and the Y direction. In the tiling pattern TP1 which is a textile pattern in which the converted images IM2 are repeatedly arranged adjacent to each other in the X and Y directions, the hue of the joint between the converted images IM2 is not conspicuous.

The same can be applied to a case in which the input image IM1 is a stripe image having a vertical stripe shape of one pixel line.

When the resolution conversion is performed using Equations (3) and (4) indicating the linear correspondence relationship 901 and 902 illustrated in FIG. 14, the second pixel PX2 at the Y coordinate Ys=0 and the second pixel PX2 at the Y coordinate Ye=2 may have different densities in the converted image IM2.

Figure 11:
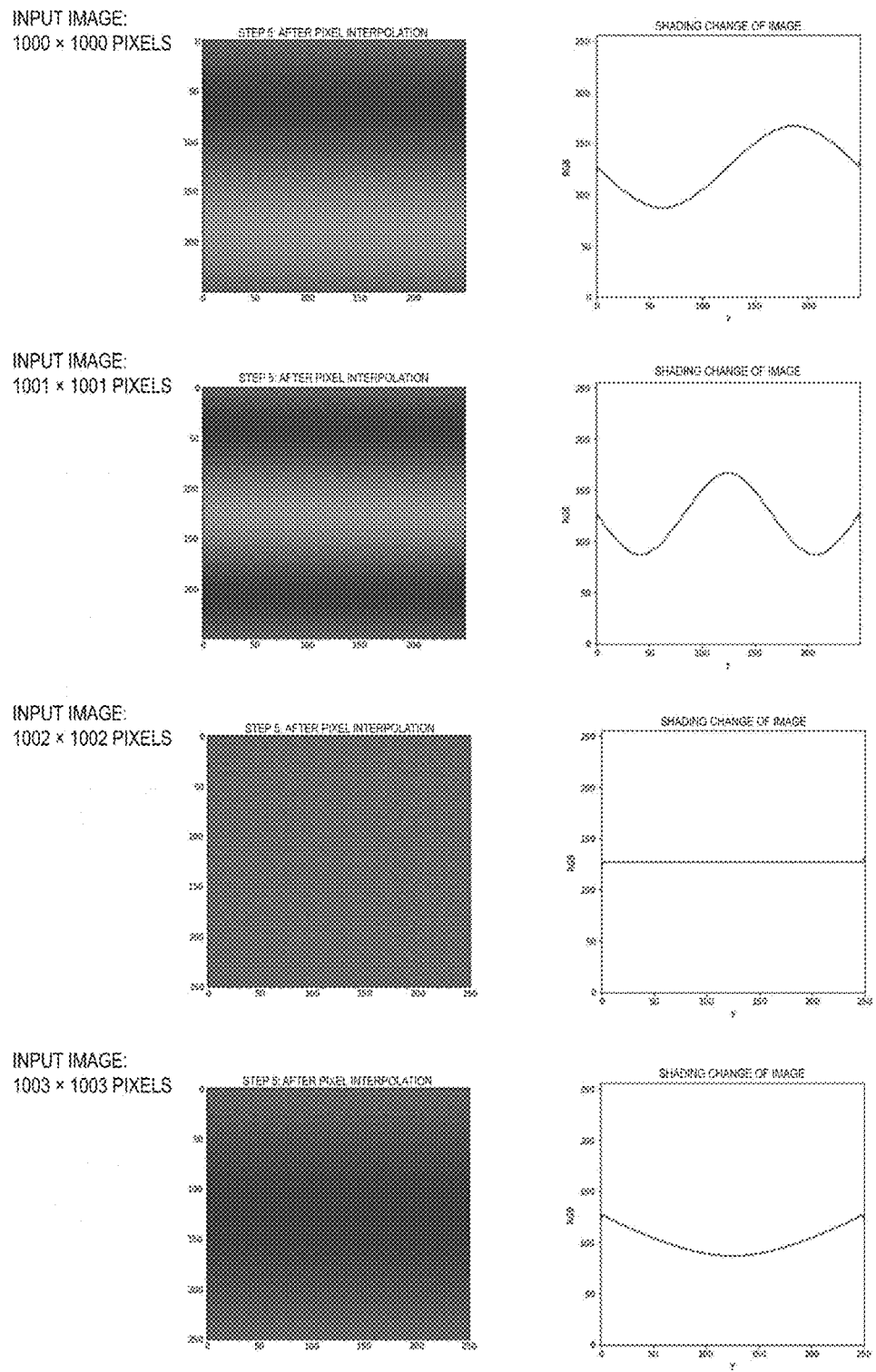
FIG. 11 is a diagram schematically illustrating an example of a converted image formed from a stripe image of one pixel line.

FIG. 11 schematically illustrates four examples of the converted images IM2 formed from the input image IM1 which is a stripe image of one pixel line when the offset amount α1=0.5 is applied to above Equation (5) indicating the correspondence relationship 401 illustrated in FIG. 4.

In the four examples illustrated in FIG. 11, in the input image IM1, the pixel values (the R value, the G value, and the B value) of the first pixels PX1 of which the Y coordinate is an even number are all the gradation value 0 indicating black, and the pixel values (the R value, the G value, and the B value) of the first pixels PX1 of which the Y coordinate is an odd number are all the gradation value 255 indicating white. The image sizes of the input images IM1 are, in order from the top, X1=Y1=1000 pixels, X1=Y1=1001 pixels, X1=Y1=1002 pixels, and X1=Y1=1003 pixels. Each of the converted images IM2 is an image obtained by performing the resolution conversion to reduce the number of pixels of the input image IM1 at a conversion magnification of 0.25 in both the X and Y directions. The converted image IM2 of X2=Y2=250 pixels is obtained from the input image IM1 of X1=Y1=1000 pixels and X1=Y1=1001 pixels, and the converted image IM2 of X2=Y2=251 pixels is obtained from the input image IM1 of X1=Y1=1002 pixels and X1=Y1=1003 pixels. The graph on the right side of each of the converted images IM2 indicates the pixel values (the R value, the G value, and the B value) of the second pixels PX2 with respect to the Y coordinate in the X-Y coordinate plane adjusted to the converted image IM2. In each graph, a horizontal axis is the Y coordinate indicating a position of the second pixel PX2 in the Y direction, and a vertical axis is a pixel value of the second pixel PX2.

As illustrated in FIG. 11, in accordance with the image size of the input image IM1, moire corresponding to a change in the pixel value of the converted image IM2 occurs in the converted image IM2. However, in each of the converted images IM2, the pixel values at both ends in the Y direction are uniform, and the densities at both ends in the Y direction are uniform.

Figure 12:
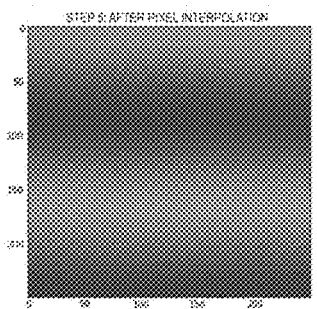
FIG. 12 is a diagram schematically illustrating a comparative example of a converted image formed from a stripe image of one pixel line.
Figure 12:
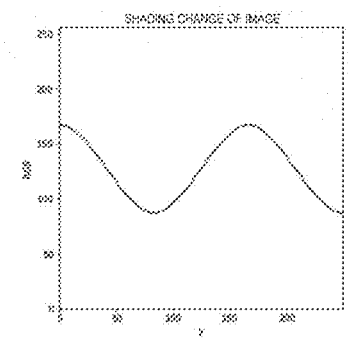
Figure 12:
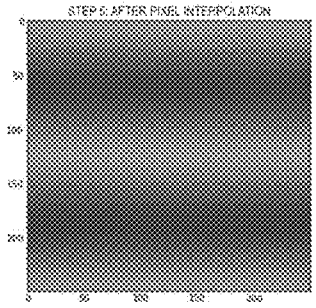
Figure 12:
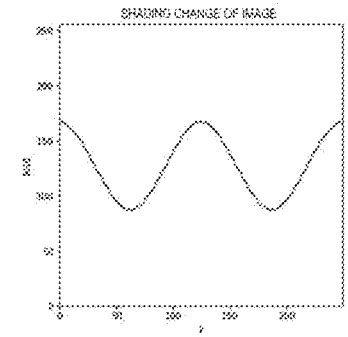
Figure 12:
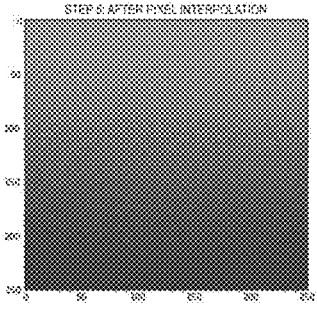
Figure 12:
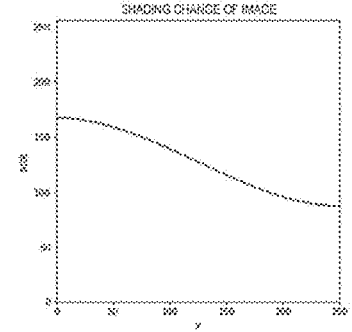
Figure 12:
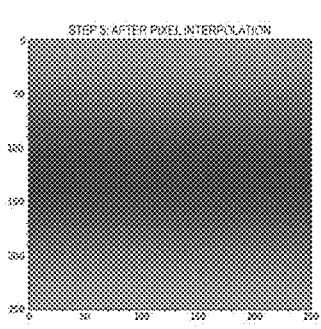
Figure 12:
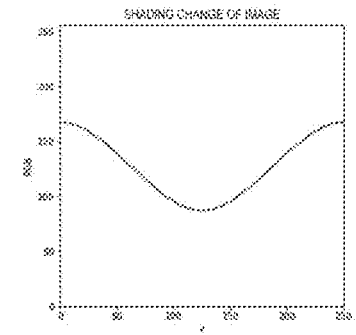
Figure 13:
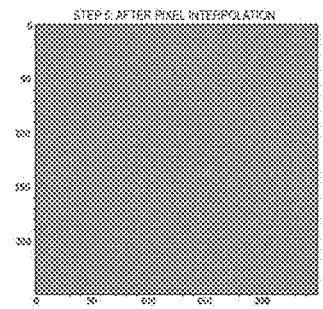
FIG. 13 is a diagram schematically illustrating a comparative example of a converted image formed from a stripe image of one pixel line.
Figure 13:
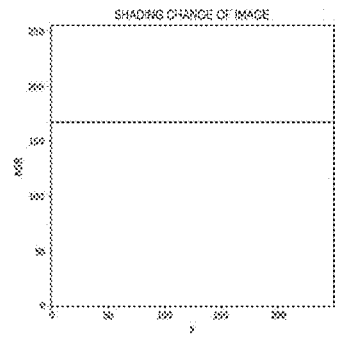
Figure 13:
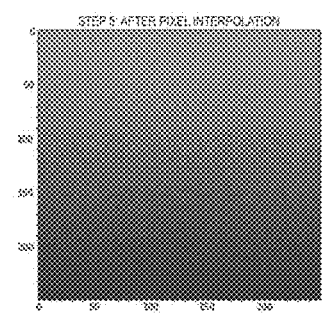
Figure 13:
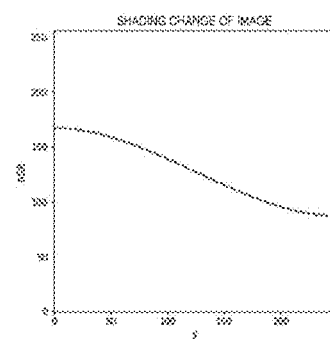
Figure 13:
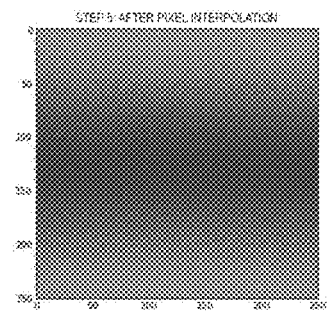
Figure 13:
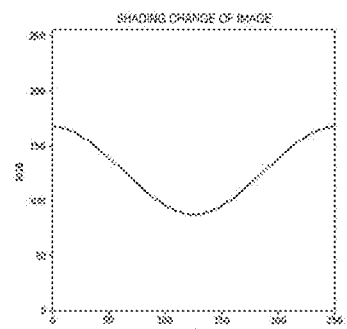
Figure 13:
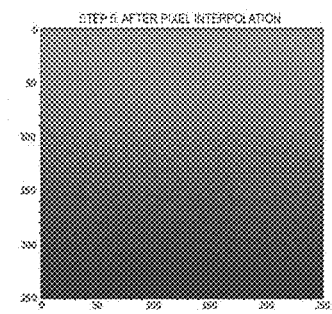
Figure 13:
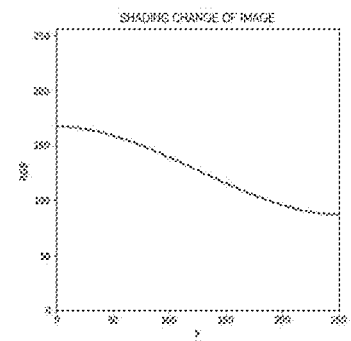

FIG. 12 schematically illustrates four examples of the converted image IM2 formed from the input image IM1 which is a stripe image of one pixel line in a comparative example in which the resolution conversion is performed using above Equation (3) indicating the linear correspondence relationship 901 illustrated in FIG. 14. FIG. 13 schematically illustrates four examples of the converted image IM2 formed from the input image IM1 which is a stripe image of one pixel line in a comparative example in which the resolution conversion is performed using above Equation (4) indicating the linear correspondence relationship 902 illustrated in FIG. 14. The four input images IM1 illustrated in each of FIGS. 12 and 13 are the same as the four input images IM1 in the example illustrated in FIG. 11. The conversion magnification in the X and Y directions is 0.25, which is the same as the example illustrated in FIG. 11. The image size of the obtained converted image IM2 is the same as the example illustrated in FIG. 11. The graph on the right side of each of the converted images IM2 indicates the pixel values (the R value, the G value, and the B value) of the second pixels PX2 with respect to the Y coordinate in the X-Y coordinate plane adjusted to the converted image IM2.

As illustrated in FIG. 12, moire corresponding to a change in the pixel value of the converted image IM2 occurs in the converted image IM2 in accordance with the image size of the input image IM1, but the moire illustrated in FIG. 12 is different from the moire illustrated in FIG. 11. In the comparative example illustrated in FIG. 12, calculation errors may occur due to integer processing or the like, and the densities at both ends in the Y direction of the converted image IM2 illustrated in FIG. 12 may or may not be uniform.

In the converted image IM2 illustrated in FIG. 13, when the image size of the input image IM1 is X1=Y1=1000 pixels, moire does not occur, and when the image size of the input image IM1 is another size, moire that varies according to the image size of the input image IM1 occurs. The moire illustrated in FIG. 13 is different from the moire illustrated in FIG. 11. The densities at both ends in the Y direction of the converted image IM2 illustrated in FIG. 13 may or may not be uniform.

As illustrated in FIGS. 11 to 13, the image processing of the specific example can generate the converted image IM2 with harmonized hue regardless of the conversion magnification of the resolution conversion and the image size of the converted image IM2.

(5) MODIFIED EXAMPLES

Within the scope of the disclosure, various modified examples are conceivable.

For example, the datum point determination unit U1 and the interpolation unit U2 may be provided in the printer 200. Therefore, the tiling pattern outputting processing illustrated in FIG. 9 may be performed by the printer 200.

The entity that performs the tiling pattern outputting processing is not limited to the CPU, and may be an electronic component other than the CPU, such as an ASIC. ASIC is an abbreviation for Application Specific Integrated Circuit. Of course, a plurality of CPUs may cooperate to perform the tiling pattern outputting processing, or a CPU and another electronic component (for example, an ASIC) may cooperate to perform the tiling pattern outputting processing.

The tiling pattern output processing can be changed as appropriate, such as by changing the order. For example, in the tiling pattern outputting processing, the processing of S104 and the processing of S106 can be interchanged. Further, the tiling process that generates tiling pattern ink amount data in which ink amount data is repeatedly arranged adjacent to each other may be performed immediately after the color conversion processing of the S118, and the tiling pattern data may be generated by performing the halftone processing on the tiling pattern ink amount data. Further, the tiling processing that generates a tiling pattern image in which the converted images IM2 are repeatedly arranged adjacent to each other may be performed immediately after the converted image IM2 is generated, and the color conversion processing and the halftone processing may be performed on the tiling pattern image to generate the tiling pattern data.

The color system of the input image IM1 is not limited to RGB, and may be CMY, CMYK, or the like. The color system of the converted image IM2 is matched with the color system of the input image IM1.

The shift amount (refer to FIGS. 4 and 7) of the datum point P0 to inside of the input image IM1 with reference to the linear correspondence relationship 901 is not limited to linearly changing in accordance with the coordinates on the converted image IM2. When the coordinates of the datum point P0 of the second start end pixel PX2s and the second terminal end pixel PX2e (refer to FIG. 2) in the X and Y directions are shifted to inside of the input image IM1 by the pixel of the offset amount α, a basic effect of further harmonizing the hue in a resolution-converted image can be obtained. Therefore, the correspondence relationships 401 and 402 illustrated in FIGS. 4 and 7 may be replaced with a curved correspondence relationship or the like.

(6) CONCLUSION

As described above, according to various aspects of the present disclosure, it is possible to provide a technology or the like capable of further harmonizing the hue in an image after resolution conversion. Of course, even a technique including only the components recited in the independent claims produces the above-described basic advantages.

Furthermore, the aspects of the disclosure can implement configurations resulting from mutual replacement of components disclosed in the above-described examples or a change in the combination of the components, configurations resulting from mutual replacement of components disclosed in the known art and the above-described examples or a change in the combination of the components, and the like. The aspects of the disclosure include these configurations and the like.

What is claimed is:

1. An image processing apparatus configured to perform image processing of converting a resolution of an input image including a plurality of first pixels arranged in a first direction and a second direction intersecting the first direction and thereby acquiring a converted image including a plurality of second pixels arranged in the first direction and the second direction, the image processing apparatus comprising:
   a datum point determination unit configured to determine, in a coordinate plane of the input image, coordinates of a datum point for determining pixel values of the second pixels included in the converted image; and
   an interpolation unit configured to determine the pixel values of the second pixels based on pixel values of a plurality of reference pixels within a predetermined range based on the datum point among the plurality of first pixels, wherein
   coordinates in the first direction of the first pixels present at both ends in the first direction among the plurality of first pixels are set as first direction end portion coordinates and
   the datum point determination unit determines coordinates, in the first direction of the datum point, of the second pixels present at both ends in the first direction among the plurality of second pixels to be coordinates shifted to further inside of the input image than the first direction end portion coordinates by a distance longer than 0 and shorter than one pixel of the input image.

2. The image processing apparatus according to claim 1, wherein
   coordinates in the second direction of the first pixels present at both ends in the second direction among the plurality of first pixels are set as second direction end portion coordinates and
   the datum point determination unit determines coordinates, in the second direction of the datum point of the second pixels present at both ends in the second direction among the plurality of second pixels to be coordinates shifted to further inside of the input image than the second direction end portion coordinates by a distance longer than 0 and shorter than one pixel of the input image.

3. The image processing apparatus according to claim 1, wherein
   among the plurality of first pixels, a first pixel at a start end in the first direction is set as a first start end pixel, and a first pixel at a terminal end in the first direction is set as a first terminal end pixel, among the plurality of second pixels, a second pixel at a start end in the first direction is set as a second start end pixel, and a second pixel at a terminal end in the first direction is set as a second terminal end pixel, among the plurality of second pixels, a second pixel between the second start end pixel and the second terminal end pixel in the first direction is set as an intervening pixel, with reference to a linear correspondence relationship in which coordinates of the first start end pixel and the second start end pixel in the first direction are set as an origin, and a coordinate of the second terminal end pixel in the first direction is assigned to a coordinate of the first terminal end pixel in the first direction, a degree to which the datum point is shifted to inside of the input image in the first direction is set as a shift amount, and the datum point determination unit determines the coordinate of the intervening pixel in the first direction of the datum point so that the shift amount of the intervening pixel is smaller than the shift amount of the second start end pixel and the second terminal end pixel.

4. The image processing apparatus according to claim 3, wherein the datum point determination unit determines the coordinate of the intervening pixel in the first direction of the datum point so that the shift amount of the second pixel decreases as the second pixel becomes closer, in the first direction, to an intermediate position between the second start end pixel and the second terminal end pixel.

5. The image processing apparatus according to claim 1, wherein
  pixel values of the plurality of reference pixels are 16 pixel values used for an interpolation operation by a bicubic method and
  the interpolation unit determines the pixel value of the second pixel by performing the interpolation operation using the 16 pixel values.

6. The image processing apparatus according to claim 1, wherein
  when the datum point determination unit performs processing of reducing the number of pixels in the first direction as the image processing, the datum point determination unit determines coordinates, in the first direction of the datum point, of the second pixels present at both ends in the first direction among the plurality of second pixels to be coordinates shifted to further inside of the input image than the first direction end portion coordinates by 0.5 pixels of the input image.

7. The image processing apparatus according to claim 1, wherein
  when the datum point determination unit performs processing of increasing the number of pixels in the first direction as the image processing, the datum point determination unit determines coordinates in the first direction of the datum point of the second pixels present at both ends in the first direction among the plurality of second pixels to be coordinates shifted to further inside of the input image than the first direction end portion coordinates by a distance longer than 0 and shorter than 0.5 pixels of the input image.

8. A printing system comprising:
  the image processing apparatus according to claim 1;
  a print head including a plurality of nozzles configured to discharge liquid onto a medium; and
  a control unit configured to control discharge of the liquid from the print head so that a printed image based on the converted image is formed on the medium.

9. The printing system according to claim 8, wherein the control unit controls the discharge of the liquid from the print head so that a tiling pattern in which the converted images are repeatedly arranged adjacent to each other is formed as the print image on the medium.

10. An image processing method for converting a resolution of an input image including a plurality of first pixels arranged in a first direction and a second direction intersecting the first direction and thus acquiring a converted image including a plurality of second pixels arranged in the first direction and the second direction, the image processing method comprising:
  a datum point determination step of determining coordinates of a datum point for determining, in a coordinate plane of the input image, pixel values of the second pixels included in the converted image; and
  an interpolation step of determining the pixel values of the second pixels based on pixel values of a plurality of reference pixels in a predetermined range with reference to the datum point among the plurality of first pixels, wherein
  coordinates in the first direction of the first pixels present at both ends in the first direction among the plurality of first pixels are first direction end portion coordinates and
  in the datum point determination step, coordinates in the first direction of the datum point of the second pixels present at both ends in the first direction among the plurality of second pixels are determined to be coordinates shifted to further inside of the input image than the first direction end portion coordinates by a distance longer than 0 and shorter than one pixel of the input image.

* * * * *